United States Patent
Seo et al.

(10) Patent No.: US 11,343,028 B2
(45) Date of Patent: *May 24, 2022

(54) METHOD WHEREBY TERMINAL TRANSMITS ACK/NACK IN WIRELESS COMMUNICATION SYSTEM, AND DEVICE THEREFOR

(71) Applicant: LG ELECTRONICS INC., Seoul (KR)

(72) Inventors: Dongyoun Seo, Seoul (KR); Joonkui Ahn, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

This patent is subject to a terminal disclaimer.

(21) Appl. No.: 16/915,775

(22) Filed: Jun. 29, 2020

(65) Prior Publication Data

US 2020/0328853 A1    Oct. 15, 2020

Related U.S. Application Data

(63) Continuation of application No. 16/390,971, filed on Apr. 22, 2019, now Pat. No. 10,742,363, which is a
(Continued)

(51) Int. Cl.
*H04L 1/18* (2006.01)
*H04L 5/00* (2006.01)
*H04L 5/14* (2006.01)

(52) U.S. Cl.
CPC .......... *H04L 1/1861* (2013.01); *H04L 1/1854* (2013.01); *H04L 5/001* (2013.01);
(Continued)

(58) Field of Classification Search
CPC ..... H04L 1/1854; H04L 1/1861; H04L 5/001; H04L 5/0032; H04L 5/0055; H04L 5/14;
(Continued)

(56) References Cited

U.S. PATENT DOCUMENTS

2010/0291937 A1    11/2010    Hu et al.
2011/0038285 A1    2/2011    Kwon et al.
(Continued)

FOREIGN PATENT DOCUMENTS

CN    102651680    8/2012
EP    2672775    12/2013
(Continued)

OTHER PUBLICATIONS

U.S. Appl. No. 16/390,971, Office Action dated Nov. 5, 2019, 32 pages.
(Continued)

*Primary Examiner* — Kan Yuen
(74) *Attorney, Agent, or Firm* — Lee Hong Degerman Kang & Waimey

(57) ABSTRACT

Provided are a method whereby a terminal transmits an acknowledgement/not-acknowledgement (ACK/NACK) with a primary cell and a secondary cell aggregated, and a device for supporting the method. The method comprises: receiving data by a downlink subframe of a secondary cell; and transmitting an ACK/NACK for the data by an uplink subframe of a primary cell, wherein: the time interval between the downlink subframe and the uplink subframe is determined by a first hybrid automatic repeat request (HARQ) timing or a second HARQ timing; the first HARQ timing is an HARQ timing which is applied when the primary cell is used alone; and the second HARQ timing is an HARQ timing which is additional to the first HARQ timing.

6 Claims, 22 Drawing Sheets

Related U.S. Application Data continuation of application No. 15/026,214, filed as application No. PCT/KR2014/009382 on Oct. 6, 2014, now Pat. No. 10,320,532.

(60) Provisional application No. 61/886,669, filed on Oct. 4, 2013, provisional application No. 61/896,016, filed on Oct. 25, 2013, provisional application No. 61/906,880, filed on Nov. 20, 2013.

(52) U.S. Cl.
CPC .......... *H04L 5/0032* (2013.01); *H04L 5/0055* (2013.01); *H04L 5/14* (2013.01); *H04L 5/143* (2013.01); *H04L 5/1469* (2013.01)

(58) Field of Classification Search
CPC ..... H04L 5/143; H04L 5/1469; H04L 5/0035; H04W 72/14; H04W 76/15
See application file for complete search history.

(56) References Cited

U.S. PATENT DOCUMENTS

| | | | |
|---|---|---|---|
| 2013/0028227 A1* | 1/2013 | Kim | H04W 72/04 370/329 |
| 2013/0188535 A1 | 7/2013 | Seo et al. | |
| 2013/0242813 A1 | 9/2013 | Wang et al. | |
| 2013/0242881 A1 | 9/2013 | Wang et al. | |
| 2013/0258970 A1* | 10/2013 | Kim | H04L 1/0028 370/329 |
| 2014/0247795 A1* | 9/2014 | Kim | H04W 4/70 370/329 |
| 2015/0003302 A1 | 1/2015 | Ekpenyong | |
| 2015/0023228 A1 | 1/2015 | Yin et al. | |
| 2015/0304087 A1 | 10/2015 | He et al. | |
| 2016/0226631 A1 | 8/2016 | Seo et al. | |
| 2016/0241363 A1 | 8/2016 | Noh et al. | |
| 2019/0253205 A1 | 8/2019 | Seo et al. | |

FOREIGN PATENT DOCUMENTS

| | | |
|---|---|---|
| EP | 2688237 | 1/2014 |
| WO | 2012/112008 | 8/2012 |
| WO | 2012108720 | 8/2012 |
| WO | 2012124980 | 9/2012 |
| WO | 2013043023 | 3/2013 |
| WO | 2013/112575 | 8/2013 |
| WO | 2014/089107 | 6/2014 |

OTHER PUBLICATIONS

European Patent Office Application No. 14850736.1, Patent Certificate dated Apr. 18, 2018, 45 pages.
European Patent Office Application No. 14850736.1, Search Report dated Feb. 14, 2017, 13 pages.
NEC, "CA-based aspects for FDD-TDD joint operation," 3GPP TSG RAN WG1 #74bis, R1-134253, Oct. 7-11, 2013, 4 pages.
U.S. Appl. No. 15/026,214, Office Action dated Jul. 20, 2018, 15 pages.
U.S. Appl. No. 15/026,214, Final Office Action dated Jan. 22, 2018, 14 pages.
U.S. Appl. No. 15/026,214, Office Action dated Aug. 9, 2017, 15 pages.
Indian Intellectual Property Office Application No. 201637011659, Office Action dated Nov. 29, 2019, 7 pages.
Japan Patent Office Application No. 2016-520064, Office Action dated Mar. 14, 2017, 2 pages.
LG Electronics, "HARQ timing for TDD-FDD carrier aggregation," 3GPP TSG RAN WG1 #74bis, R1-134396, Oct. 7-11, 2013, 6 pages.
BlackBerry UK Limited, "Solutions for TDD-FDD joint carrier aggregation," 3GPP TSG RAN WG1 #74bis, R1-134551, Oct. 7-11, 2013, 5 pages.
PCT International Application No. PCT/KR2014/009382, Written Opinion of the International Searching Authority dated Dec. 31, 2014, 2 pages.
ETRI, "Discussion on FDD-TDD joint operation solutions", R1-133184, 3GPP TSG RAN WG1 Meeting #74, Aug. 2013, 8 pages.

\* cited by examiner

METHOD WHEREBY TERMINAL TRANSMITS ACK/NACK IN WIRELESS COMMUNICATION SYSTEM, AND DEVICE THEREFOR

CROSS-REFERENCE TO RELATED APPLICATIONS

This application is a continuation of U.S. patent application Ser. No. 16/390,971, filed on Apr. 22, 2019, which is a continuation of U.S. patent application Ser. No. 15/026,214, filed on Mar. 30, 2016, now U.S. Pat. No. 10,320,532, which is the National Stage filing under 35 U.S.C. 371 of International Application No. PCT/KR2014/009382, filed on Oct. 6, 2014, which claims the benefit of U.S. Provisional Application No. 61/886,669, filed on Oct. 4, 2013, 61/896,016, filed on Oct. 25, 2013 and 61/906,880, filed on Nov. 20, 2013, the contents of which are all hereby incorporated by reference herein in their entirety.

BACKGROUND OF THE INVENTION

Field of the Invention

The present invention relates to wireless communications, and more particularly, to a method whereby a terminal transmits an acknowledgement/not-acknowledgement (ACK/NACK) with serving cells aggregated using different types of radio frames, and a device thereof.

Related Art

Long Term Evolution (LTE) based on $3^{rd}$ Generation Partnership Project (3GPP) Technical Specification (TS) Release 8 is the leading next-generation mobile communication standard.

As disclosed in 3GPP TS 36.211 V8.7.0 (2009-05) "Evolved Universal Terrestrial Radio Access (E-UTRA); Physical Channels and Modulation (Release 8)", in LTE, a physical channel can be divided into a Physical Downlink Shared Channel (PDSCH) and a Physical Downlink Control Channel (PDCCH), that is, downlink channels, and a Physical Uplink Shared Channel (PUSCH) and a Physical Uplink Control Channel (PUCCH), that is, uplink channels.

A PUCCH is an uplink control channel used to send uplink control information, such as a Hybrid Automatic Repeat reQuest (HARQ), an acknowledgement/not-acknowledgement (ACK/NACK) signal, a Channel Quality Indicator (CQI), and a Scheduling Request (SR).

Meanwhile, 3GPP LTE-Advanced (LTE-A) as an evolved version of 3GPP LTE is progressing. A technique introduced in the 3GPP LTE-A includes a carrier aggregation.

The carrier aggregation uses a plurality of component carriers. The component carrier is defined by a center frequency and a bandwidth. One downlink component carrier or a pair of an uplink component carrier and the downlink component carrier corresponds to one cell. A terminal receiving a service using a plurality of downlink component carriers may receive a service from a plurality of serving cells. The carrier aggregation include a cross carrier scheduling where a scheduling cell is different from a scheduled cell and a non-cross carrier scheduling where the scheduling cell is the same as the scheduled cell.

Meanwhile, serving cells using different radio frame structures such as a serving cell using a time division duplex (TDD) radio frame and a serving cell using a frequency division duplex (FDD) radio frame may be aggregated in a next generation wireless communication system. That is, a plurality of serving cells using different types of radio frames may be allocated to the terminal. Alternatively, even if a plurality of serving cells using the same type of radio frame is aggregated, uplink-downlink (UL-DL) configurations of respective serving cells may be different from each other.

For example, a TDD cell using a TTD frame may be configured as a primary cell for the terminal. A FDD cell using a FDD frame may be configured as a primary cell for the terminal. In this case, when the terminal receives data by a downlink subframe of the FDD cell, which uplink subframe of the TDD cell transmits an ACK/NACK for the data may cause a problem. For example, although a time point to transmit the ACK/NACK is determined by an ACK/NACK timing, the above method may not be applied to a partial downlink subframe of the FDD cell.

The uplink subframes may not be continuously configured in the TDD frame of the TDD cell. That is, the downlink subframe coexists with the uplink subframe in different times. On the contrary, in the FDD frame of the FDD cell, a downlink subframe and an uplink subframe may be continuously configured in different frequency bands. Accordingly, if data are received by a downlink subframe of the FDD frame existing at the same time as that of the uplink subframe of the TDD frame, when transmits an ACK/NACK for the data may cause a problem.

SUMMARY OF THE INVENTION

The present invention provides a method whereby a terminal transmits an ACK/NACK with a plurality of serving cells aggregated using different types of radio frames and a device thereof.

In one aspect, provided is a method whereby a terminal transmits an ACK/NACK in a wireless communication system. The method includes receiving data by a downlink subframe of a secondary cell and transmitting an ACK/NACK for the data by an uplink subframe for a primary cell. The time interval between the downlink subframe and the uplink subframe is determined by a first hybrid automatic repeat request (HARQ) timing or a second HARQ timing. The first HARQ timing is an HARQ timing which is applied when the primary cell is used alone and the second HARQ timing is an HARQ timing which is additional to the first HARQ timing.

In another aspect, provided is a device comprising a radio frequency (RF) unit configured to transmit and receive a radio signal and a processor connected to the RF unit. The processor receives data by a downlink subframe of a secondary cell and transmits an ACK/NACK for the data by an uplink subframe for a primary cell. The time interval between the downlink subframe and the uplink subframe is determined by a first hybrid automatic repeat request (HARQ) timing or a second HARQ timing. The first HARQ timing is an HARQ timing which is applied when the primary cell is used alone and the second HARQ timing is an HARQ timing which is additional to the first HARQ timing.

Even if a plurality of serving cells using different types of radio frames are aggregated, since the terminal may transmit the ACK/NACK, an HARQ process can be efficiently operated.

DESCRIPTION OF EXEMPLARY EMBODIMENTS

User Equipment (UE) can be fixed or can have mobility. UE can also be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

The BS commonly refers to a fixed station that communicates with UE. The BS can also be called another tem, such as an evolved-NodeB (eNodeB), a Base Transceiver System (BTS), or an access point.

Communication from a BS to UE is called downlink (DL), and communication from UE to a BS is called uplink (UL). A wireless communication system including a BS and UE can be a Time Division Duplex (TDD) system or a Frequency Division Duplex (FDD) system. A TDD system is a wireless communication system that performs UL and DL transmission/reception using different times in the same frequency band. An FDD system is a wireless communication system that enables UL and DL transmission/reception at the same time using different frequency bands. A wireless communication system can perform communication using radio frames.

Figure 1:
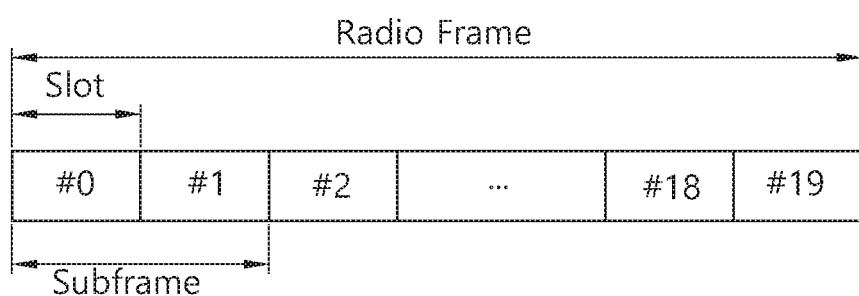
FIG. 1 shows the structure of an FDD radio frame.

FIG. 1 shows the structure of an FDD radio frame.

The FDD radio frame includes 10 subframes, and one subframe includes two consecutive slots. The slots within the radio frame are assigned indices 0-19. The time that is taken for one subframe to be transmitted is called a Transmission Time Interval (TTI). A TTI can be a minimum scheduling unit. For example, the length of one subframe can be 1 ms, and the length of one slot can be 0.5 ms. Hereinafter, the FDD radio frame may be simply referred to as an FDD frame.

Figure 2:
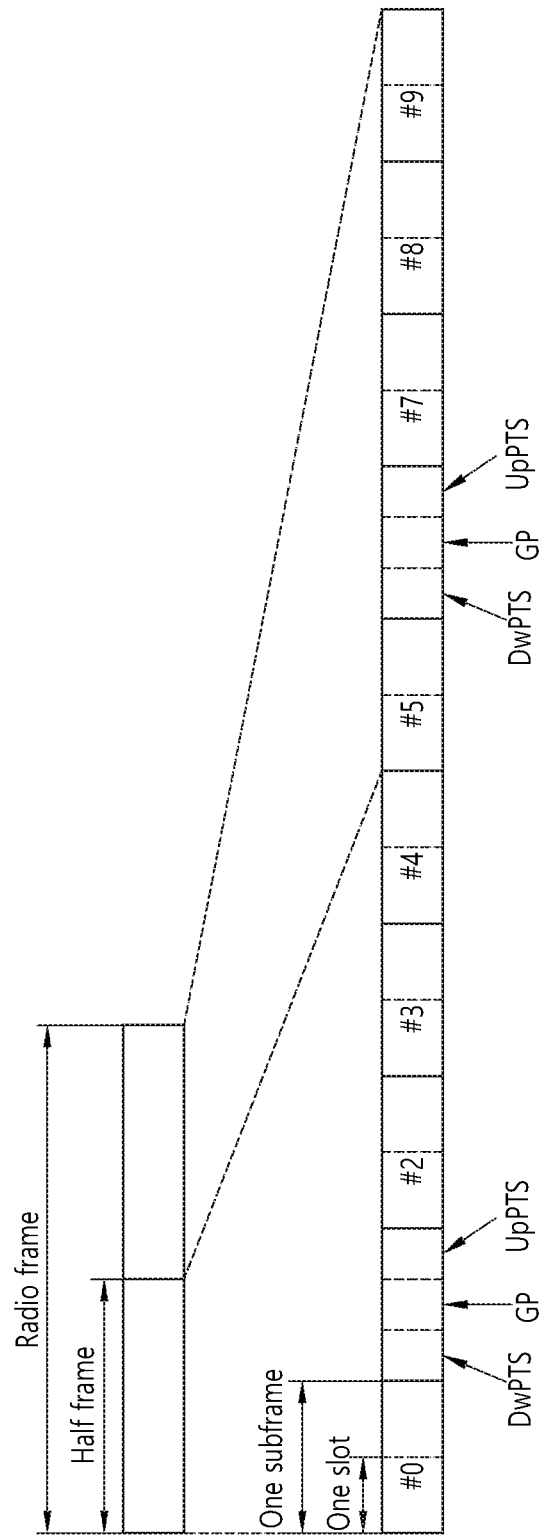
FIG. 2 shows the structure of a TDD radio frame.

FIG. 2 shows the structure of a TDD radio frame.

Referring to FIG. 2, a downlink (DL) subframe and an uplink (UL) subframe coexist in a TDD radio frame used in TDD. Table 1 shows an example of a UL-DL configuration of the radio frame.

TABLE 1

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' indicates a DL subframe, 'U' indicates a UL subframe, and 'S' indicates a special subframe. When a UL-DL configuration is received from a BS, a UE can be aware of whether each subframe in a radio frame is a DL subframe or a UL subframe. Hereinafter, reference can be made to Table 1 for a UL-DL configuration N (N is any one of 0 to 6).

In the TDD frame, a subframe having an index #1 and an index #6 may be a special subframe, and includes a downlink pilot time slot (DwPTS), a guard period (GP), and an uplink pilot time slot (UpPTS). The DwPTS is used in initial cell search, synchronization, or channel estimation in UE. The UpPTS is used for channel estimation in a BS and for the uplink transmission synchronization of UE. The GP is an interval in which interference occurring in UL due to the multi-path delay of a DL signal between UL and DL is removed. Hereinafter, the TDD radio frame may be simply referred to as a TDD frame.

Figure 3:
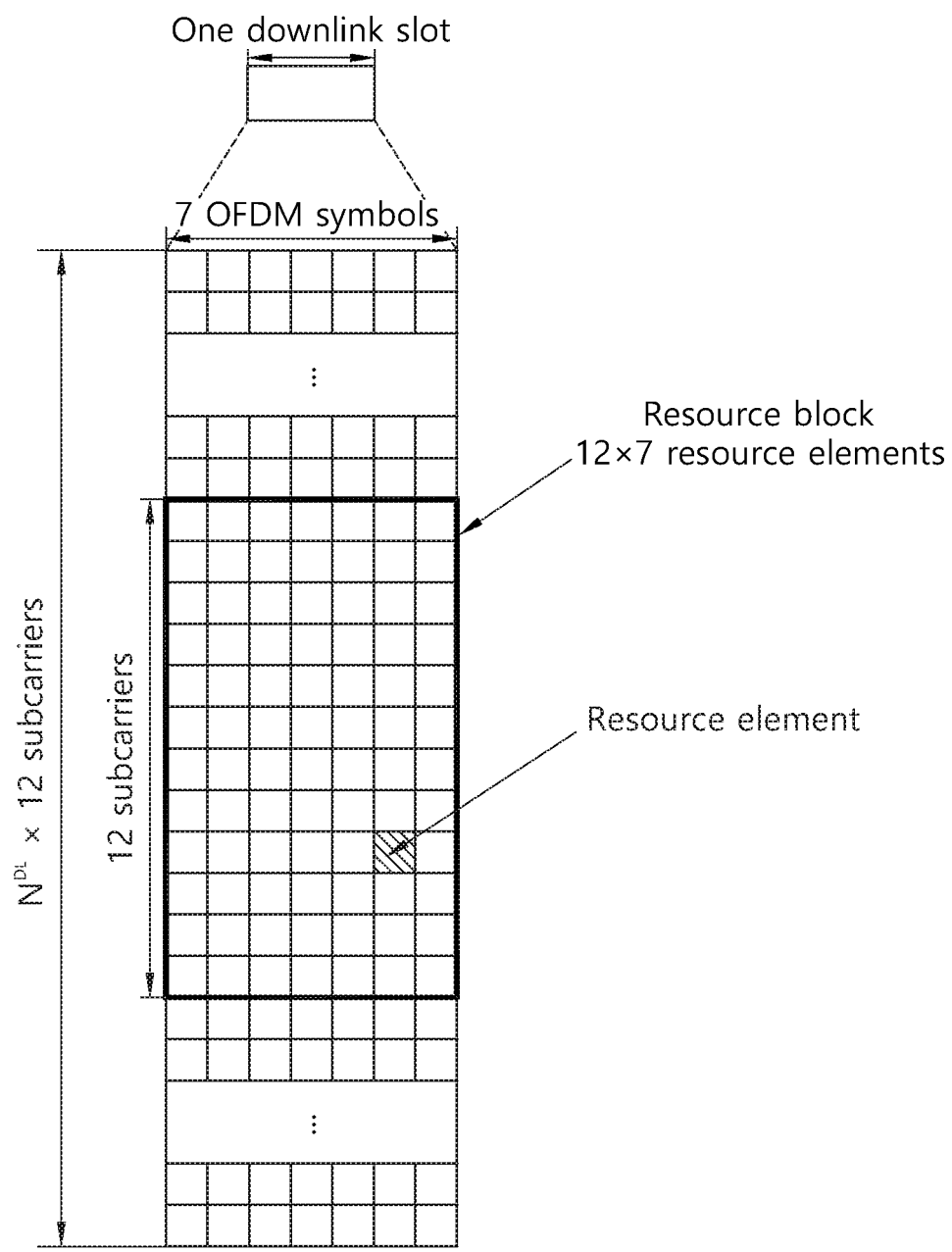
FIG. 3 shows an example of a resource grid for one downlink slot.

FIG. 3 shows an example of a resource grid for one downlink slot.

Referring to FIG. 3, the downlink slot includes a plurality of Orthogonal Frequency Division Multiplexing (OFDM) symbol in the time domain and includes $N_{RB}$ Resource Blocks (RBs) in the frequency domain. The RBs includes one slot in the time domain and a plurality of consecutive subcarrier in the frequency domain in a resource allocation unit. The number of RBs $N_{RB}$ included in the downlink slot depends on a downlink transmission bandwidth $N^{DL}$ configured in a cell. For example, in an LTE system, the $N_{RB}$ can be any one of 6 to 110. An uplink slot can have the same structure as the downlink slot.

Each element on the resource grid is called a Resource Element (RE). The RE on the resource grid can be identified by an index pair (k,l) within a slot. Here, k (k=0, ..., $N_{RB} \times 12-1$) is a subcarrier index within the frequency domain, and l (l=0, ..., 6) is an OFDM symbol index within the time domain.

Although 7×12 REs including 7 OFDM symbols in the time domain and 12 subcarrier in the frequency domain have been illustrated as being included in one RB in FIG. 3, the number of OFDM symbols and the number of subcarriers within an RB are not limited thereto. The number of OFDM symbols and the number of subcarriers can be changed in various ways depending on the length of a CP, frequency spacing, etc. In one OFDM symbol, one of 128, 256, 512, 1024, 1536, and 2048 can be selected and used as the number of subcarriers.

Figure 4:
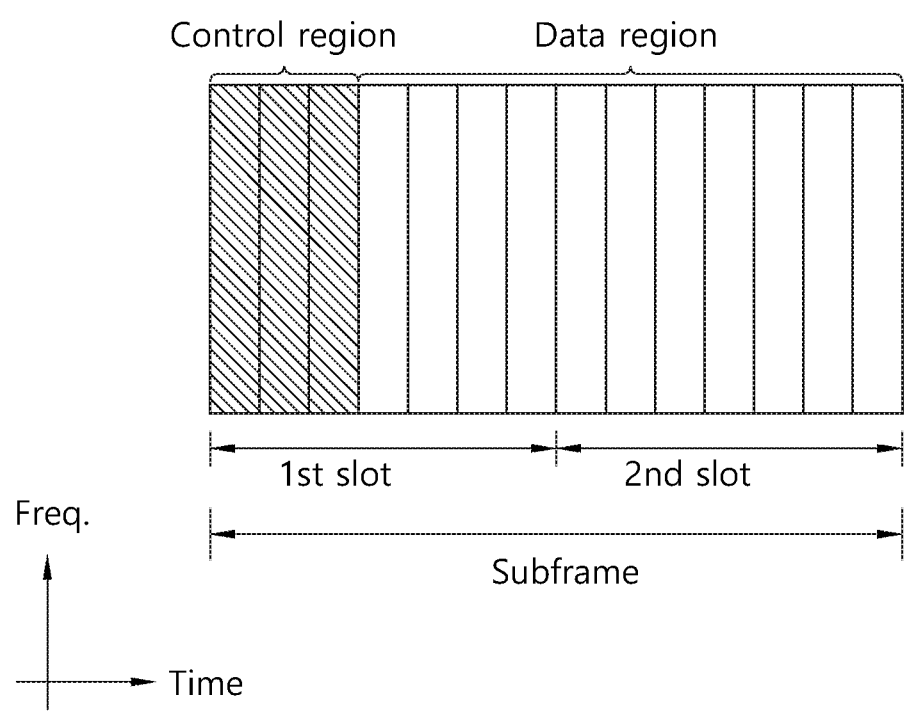
FIG. 4 shows the structure of a DL subframe.

FIG. 4 shows the structure of a DL subframe.

Referring to FIG. 4, a downlink (DL) subframe is divided into a control region and a data region in the time domain. The control region includes a maximum of former 3 (maximum 4 according to circumstances) OFDM symbols of a first slot within a subframe, but the number of OFDM symbols included in the control region can be changed. A physical downlink control channel (PDCCH) and another control channel are allocated to the control region, and a physical downlink shared channel (PDSCH) is allocated to the data region.

As disclosed in 3GPP TS 36.211 V8.7.0, in 3GPP LTE, physical channels can be divided into a physical downlink shared channel (PDSCH) and a physical uplink shared channel (PUSCH), that is, data channels, and a physical downlink control channel (PDCCH), a physical control format indicator channel (PCFICH), a physical hybrid-ARQ indicator channel (PHICH), and a physical uplink control channel (PUCCH), that is, control channels.

A PCFICH that is transmitted in the first OFDM symbol of a subframe carries a Control Format Indicator (CFI) regarding the number of OFDM symbols (i.e., the size of a control region) that are used to send control channels within the subframe. UE first receives a CFI on a PCFICH and then monitors PDCCHs. Unlike in a PDCCH, a PCFICH is not subject to blind decoding, but is transmitted through the fixed PCFICH resources of a subframe.

A PHICH carries a positive-acknowledgement (ACK)/negative-acknowledgement (NACK) signal for an uplink Hybrid Automatic Repeat reQuest (HARQ). An ACK/NACK signal for uplink (UL) data on a PUSCH which is transmitted by UE is transmitted on a PHICH.

A physical broadcast channel (PBCH) is transmitted in the former 4 OFDM symbols of a second slot within the first subframe of a radio frame. The PBCH carries system information that is essential for UE to communicate with a BS, and system information transmitted through a PBCH is called a Master Information Block (MIB). In contrast, system information transmitted on a PDSCH indicated by a PDCCH is called a System Information Block (SIB).

Control information transmitted through a PDCCH is called Downlink Control Information (DCI). DCI can include the resource allocation of a PDSCH (this is also called a DL grant), the resource allocation of a PUSCH (this is also called an UL grant), a set of transmit power control commands for individual MSs within a specific UE group and/or the activation of a Voice over Internet Protocol (VoIP). DCI has different formats, which will be described later.

A control region in a subframe includes a plurality of control channel elements (CCEs). A CCE is a logical allocation unit used to provide a coding rate according to the state of a radio channel to a PDCCH and corresponds to a plurality of resource element groups (REGs). An REG includes a plurality of REs. A PDCCH format and the number of available PDCCH bits are determined based on a relationship between the number of CCEs and a coding rate provided by CCEs.

One REG includes four REs, and one CCE includes nine REGs. To construct one PDCCH, {1, 2, 4, 8} CCEs may be used, and each element of {1, 2, 4, 8} is defined as a CCE aggregation level.

The number of CCEs used to transmit a PDDCH is determined by a base station based on a channel state.

Meanwhile, in 3GPP LTE, blind decoding is used to detect a PDCCH. Blind decoding is a process of de-masking a cyclic redundancy check (CRC) of a received PDCCH (PDCCH candidate) with a desired identifier to check a CRC error, thereby allowing a UE to identify whether the PDCCH is a control channel of the UE. The UE does not recognize a position in which a PDCCH thereof is transmitted in a control region and a CCE aggregation level or DCI format used to transmit the PDCCH.

A plurality of PDCCHs may be transmitted in one subframe. The UE monitors a plurality of PDCCHs in each subframe. Here, monitoring refers to an attempt of the UE to decode a PDCCH according to a monitored PDCCH format.

In 3GPP LET, a search space is used to reduce load caused by blind decoding. A search space may denote a monitoring set of CCEs for a PDCCH. A UE monitors a PDCCH in a corresponding search space.

A search space is divided into a common search space (CSS) and a UE-specific search space (USS). A CSS is a space for searching for a PDCCH having common control information, which includes 16 CCEs with CCE indexes of 0 to 15 and supports a PDCCH having a CCE aggregation level of {4, 8}. However, a PDCCH (DCI format 0 and 1A) carrying UE-specific information may also be transmitted to the CSS. The USS supports a PDCCH having a CEE aggregation level of {1, 2, 4, 8}.

A different start point of a search space is defined for a CSS and a USS. A start point of a CSS is fixed regardless of subframes, while a start point of a USS may change by subframe according to an UE ID (for example, C-RNTI), a CCE aggregation level and/or a slot number in a radio frame. When the start point of the USS is in the CSS, the USS and the CSS may overlap.

Figure 5:
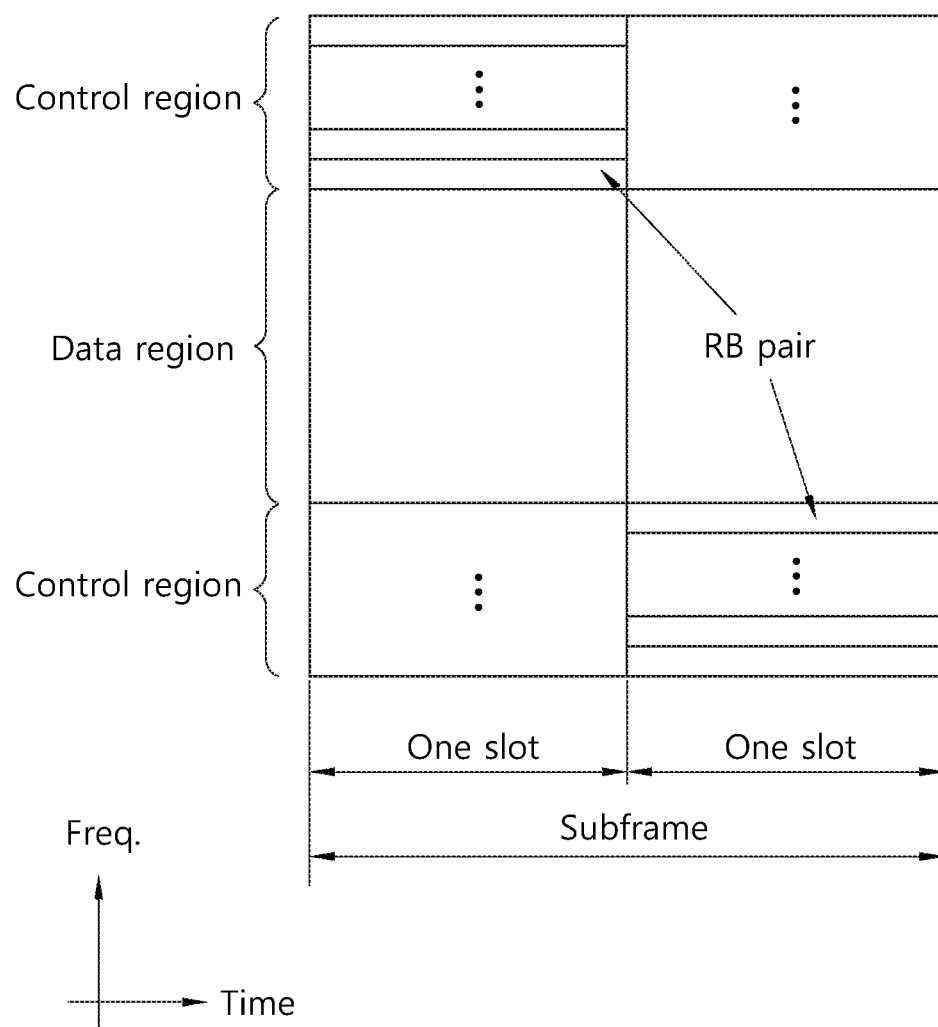
FIG. 5 shows the structure of an UL subframe.

FIG. 5 shows the structure of an UL subframe.

Referring to FIG. 5, the UL subframe can be divided into a control region to which a physical uplink control channel (PUCCH) for carrying uplink control information is allocated and a data region to which a physical uplink shared channel (PUSCH) for carrying user data is allocated in the frequency domain.

A PUCCH is allocated with an RB pair in a subframe. RBs that belong to an RB pair occupy different subcarriers in a first slot and a second slot. An RB pair has the same RB index m.

In accordance with 3GPP TS 36.211 V8.7.0, a PUCCH supports multiple formats. A PUCCH having a different number of bits in each subframe can be used according to a modulation scheme that is dependent on a PUCCH format.

Table 2 below shows an example of modulation schemes and the number of bits per subframe according to PUCCH formats.

TABLE 2

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used to send a Scheduling Request (SR), the PUCCH formats 1a/1b are used to send an ACK/NACK signal for an HARQ, the PUCCH format 2 is used to send a CQI, and the PUCCH formats 2a/2b are used to send a CQI and an ACK/NACK signal at the same time. When only an ACK/NACK signal is transmitted in a subframe, the PUCCH formats 1a/1b are used. When only an SR is transmitted, the PUCCH format 1 is used. When an SR and an ACK/NACK signal are transmitted at the same time, the PUCCH format 1 is used. In this case, the ACK/NACK signal is modulated into resources allocated to the SR and is then transmitted.

All the PUCCH formats use the Cyclic Shift (CS) of a sequence in each OFDM symbol. A CS sequence is generated by cyclically shifting a base sequence by a specific CS amount. The specific CS amount is indicated by a CS index.

An example in which a base sequence $r_u(n)$ has been defined is the same as the following equation.

$$r_u(n) = e^{jb(n)\pi/4} \quad \text{[Equation 1]}$$

Here, u is a root index, n is an element index wherein $0 \leq n \leq N-1$, and N is the length of the base sequence. b(n) is defined in section 5.5 of 3GPP TS 36.211 V8.7.0.

The length of a sequence is the same as the number of elements included in the sequence. U can be determined by a cell identifier (ID), a slot number within a radio frame, etc.

Assuming that a base sequence is mapped to one resource block in the frequency domain, the length N of the base sequence becomes 12 because one resource block includes 12 subcarriers. A different base sequence is defined depending on a different root index.

A CS sequence $r(n, I_{cs})$ can be generated by cyclically shifting the base sequence r(n) as in Equation 2.

$$r(n, I_{CS}) = r(n) \cdot \exp\left(\frac{j2\pi I_{CS} n}{N}\right), 0 \leq I_{CS} \leq N-1 \quad \text{[Equation 2]}$$

Here, $I_{cs}$ is a CS index indicative of a CS amount $(0 \leq I_{cs} \leq N-1)$.

An available CS index of a base sequence refers to a CS index that can be derived from the base sequence according to a CS interval. For example, the length of a base sequence is 12 and a CS interval is 1, a total number of available CS indices of the base sequence becomes 12. Or, if the length of a base sequence is 12 and a CS interval is 2, a total number of available CS indices of the base sequence becomes 6.

Figure 6:
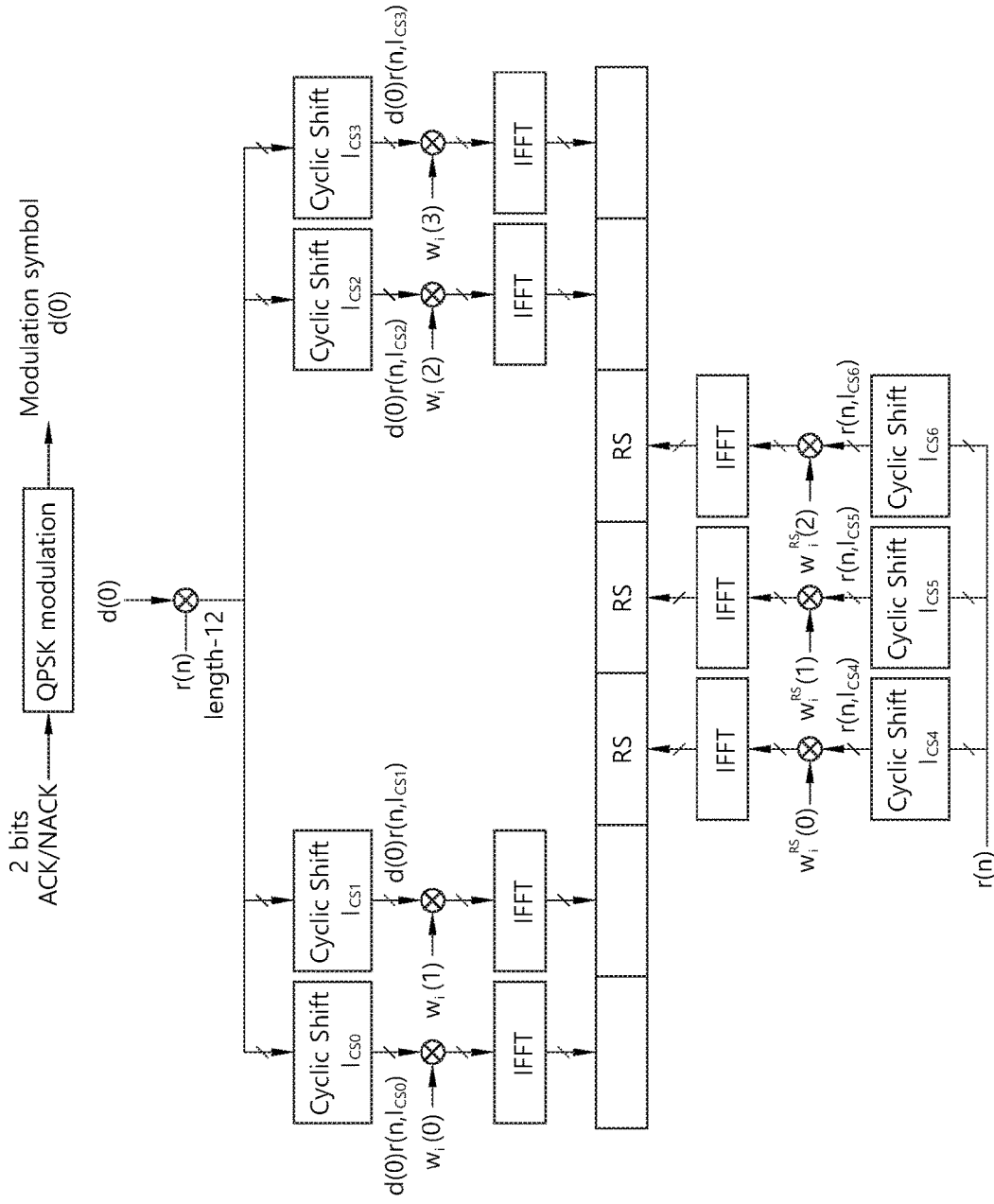
FIG. 6 shows the channel structure of a PUCCH format 1b in a normal CP.

FIG. 6 shows the channel structure of the PUCCH format 1b in a normal CP.

One slot includes 7 OFDM symbols, the 3 OFDM symbols become Reference Signal (RS) OFDM symbols for a reference signal, and the 4 OFDM symbols become data OFDM symbols for an ACK/NACK signal.

In the PUCCH format 1b, a modulation symbol d(0) is generated by performing Quadrature Phase Shift Keying (QPSK) modulation on an encoded 2-bit ACK/NACK signal.

A CS index $I_{cs}$ can vary depending on a slot number 'ns' within a radio frame and/or a symbol index 'l' within a slot.

In a normal CP, 4 data OFDM symbols for sending an ACK/NACK signal are present in one slot. It is assumed that corresponding CS indices in respective data OFDM symbols are $I_{cs0}$, $I_{cs1}$, $I_{cs2}$, and $I_{cs3}$.

The modulation symbol d(0) is spread into a CS sequence r(n,Ics). Assuming that a 1-dimensional spread sequence corresponding to an $(i+1)^{th}$ OFDM symbol is m(i) in a slot, $\{m(0), m(1), m(2), m(3)\} = \{d(0)r(n,I_{cs0}), d(0)r(n,I_{cs1}), d(0)r(n,I_{cs2}), d(0)r(n,I_{cs3})\}$ can be obtained.

In order to increase a UE capacity, the 1-dimensional spread sequence can be spread using an orthogonal sequence. The following sequence is used as an orthogonal sequence $w_i(k)$ (i is a sequence index, $0 \leq k \leq K-1$) wherein a spreading factor K=4.

TABLE 3

| Index (i) | [$w_i(0)$, $w_i(1)$, $w_i(2)$, $w_i(3)$] |
| --- | --- |
| 0 | [+1, +1, +1, +1] |
| 1 | [+1, −1, +1, −1] |
| 2 | [+1, −1, −1, +1] |

The following sequence is used as an orthogonal sequence $w_i(k)$ (i is a sequence index, $0 \leq k \leq K-1$) wherein a spreading factor K=3.

TABLE 4

| Index (i) | [$w_i(0)$, $w_i(1)$, $w_i(2)$] |
| --- | --- |
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used in each slot.

Accordingly, assuming that a specific orthogonal sequence index i is given, 2-dimensional spread sequences $\{s(0), s(1), s(2), s(3)\}$ can be expressed as follows.

$\{s(0), s(1), s(2), s(3)\} = \{w_i(0)m(0), w_i(1)m(1), w_i(2)m(2), w_i(3)m(3)\}$

The 2-dimensional spread sequences $\{s(0), s(1), s(2), s(3)\}$ are subject to IFFT and then transmitted in a corresponding OFDM symbol. Accordingly, an ACK/NACK signal is transmitted on a PUCCH.

A reference signal having the PUCCH format 1b is also transmitted by spreading the reference signal into an orthogonal sequence after cyclically shifting a base sequence r(n). Assuming that CS indices corresponding to 3 RS OFDM symbols are $I_{cs4}$, $I_{cs5}$, and $I_{cs6}$, 3 CS sequences $r(n,I_{cs4})$, $r(n,I_{cs5})$, $r(n,I_{cs6})$ can be obtained. The 3 CS sequences are spread into an orthogonal sequence $w^{RS}_i(k)$ wherein K=3.

An orthogonal sequence index i, a CS index Ls, and an RB index m are parameters necessary to configure a PUCCH and are also resources used to classify PUCCHs (or MSs). If the number of available CSs is 12 and the number of available orthogonal sequence indices is 3, a PUCCH for a total of 36 MSs can be multiplexed with one RB.

In 3GPP LTE, a resource index $n^{(1)}_{PUCCH}$ is defined so that UE can obtain the three parameters for configuring a PUCCH. The resource index $n^{(1)}_{PUCCH} = n_{CCE} + N^{(1)}_{PUCCH}$, wherein $n_{CCE}$ is the number of the first CCE used to send a corresponding PDCCH (i.e., PDCCH including the allocation of DL resources used to received downlink data corresponding to an ACK/NACK signal), and $N^{(1)}_{PUCCH}$ is a parameter that is informed of UE by a BS through a higher layer message.

Time, frequency, and code resources used to send an ACK/NACK signal are called ACK/NACK resources or PUCCH resources. As described above, an index of ACK/NACK resources (called an ACK/NACK resource index or PUCCH index) used to send an ACK/NACK signal on a PUCCH can be represented as at least one of an orthogonal sequence index i, a CS index $I_{cs}$, an RB index m, and an index for calculating the 3 indices. ACK/NACK resources can include at least one of an orthogonal sequence, a CS, a resource block, and a combination of them.

Figure 7:
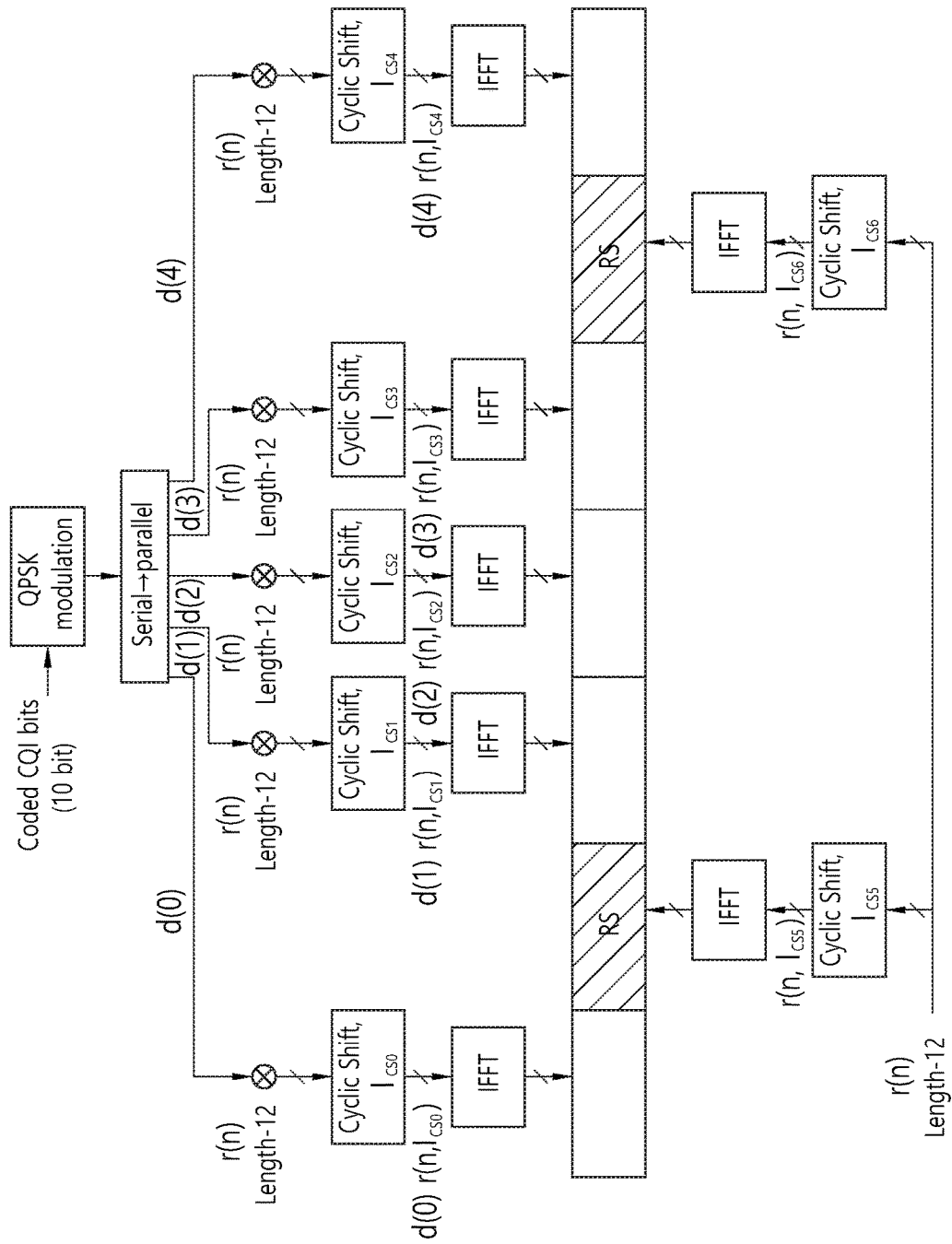
FIG. 7 shows the channel structure of PUCCH formats 2/2a/2b in a normal CP.

FIG. 7 shows the channel structure of the PUCCH formats 2/2a/2b in a normal CP.

Referring to FIG. 7, in a normal CP, OFDM symbols 1 and 5 (i.e., second and sixth OFDM symbols) are used to send a demodulation reference signal (DM RS), that is, an uplink reference signal, and the remaining OFDM symbols are used to send a CQI. In the case of an extended CP, an OFDM symbol 3 (fourth symbol) is used for a DM RS.

10 CQI information bits can be subject to channel coding at a ½ code rate, for example, thus becoming 20 coded bits. Reed-Muller code can be used in the channel coding. Next, the 20 coded bits are scramble and then subject to QPSK constellation mapping, thereby generating a QPSK modulation symbol (d(0) to d(4) in a slot 0). Each QPSK modulation symbol is modulated in a cyclic shift of a base RS sequence 'r(n)' having a length of 12, subject to IFFT, and then transmitted in each of 10 SC-FDMA symbols within a subframe. Uniformly spaced 12 CSs enable 12 different MSs to be orthogonally multiplexed in the same PUCCH RB. A base RS sequence 'r(n)' having a length of 12 can be used as a DM RS sequence applied to OFDM symbols 1 and 5.

Figure 8:
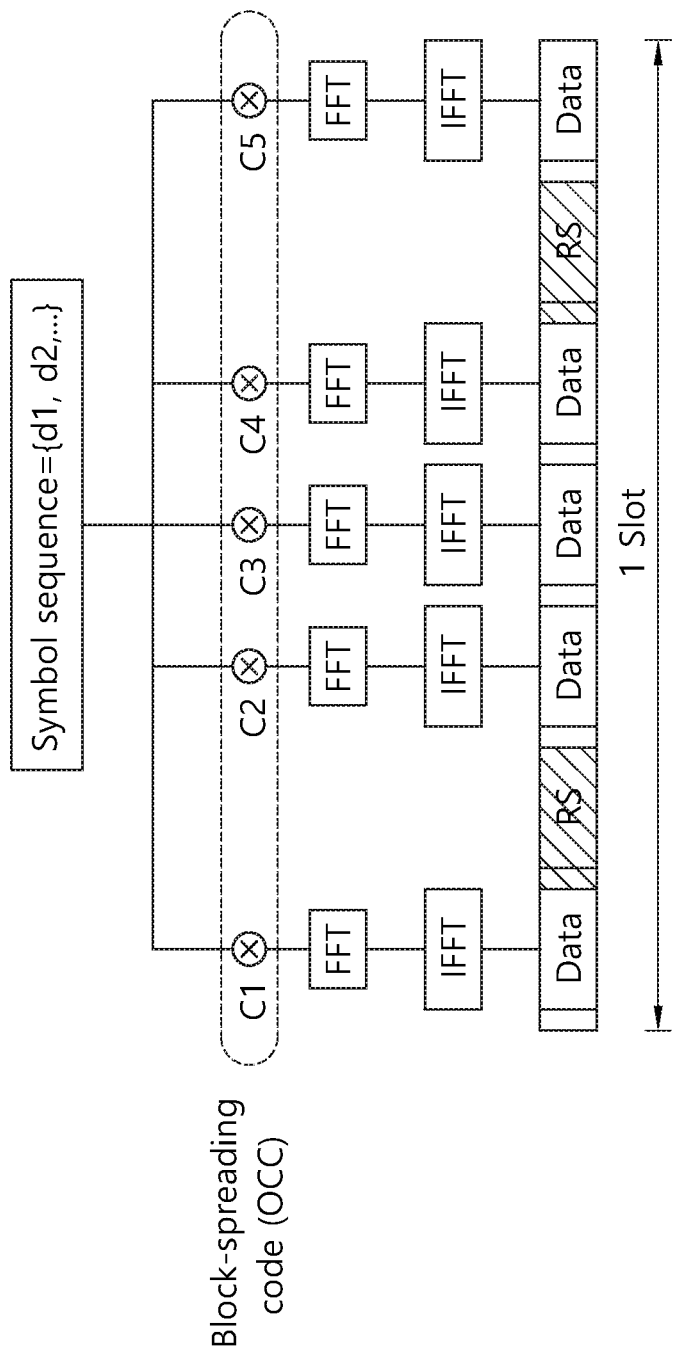
FIG. 8 illustrates the channel structure of a PUCCH format 3.

FIG. 8 shows an example of a channel structure of a PUCCH format 3.

Referring to FIG. 8, the PUCCH format 3 is a PUCCH format which uses a block spreading scheme. The block spreading scheme means a method of spreading a symbol sequence, which is obtained by modulating a multi-bit ACK/NACK, in a time domain by using a block spreading code.

In the PUCCH format 3, a symbol sequence (e.g., ACK/NACK symbol sequence) is transmitted by being spread in the time domain by using the block spreading code. An orthogonal cover code (OCC) may be used as the block spreading code. Control signals of several UEs may be multiplexed by the block spreading code. In the PUCCH format 2, a symbol (e.g., d(0), d(1), d(2), d(3), d(4), etc., of FIG. 7) transmitted in each data symbol is different, and UE multiplexing is performed using the cyclic shift of a constant amplitude zero auto-correlation (CAZAC) sequence. In contrast, in the PUCCH format 3, a symbol sequence including one or more symbols is transmitted in a frequency domain of each data symbol, the symbol sequence is spread in a time domain by using the block spreading code, and UE multiplexing is performed. An example in which 2 RS symbols are used in one slot has been illustrated in FIG. 11, but the present invention is not limited thereto. 3 RS symbols may be used, and an OCC having a spreading factor value of 4 may be used. An RS symbol may be generated from a CAZAC sequence having a specific cyclic shift and may be transmitted in such a manner that a plurality of RS symbols in the time domain has been multiplied by a specific OCC.

Figure 9:
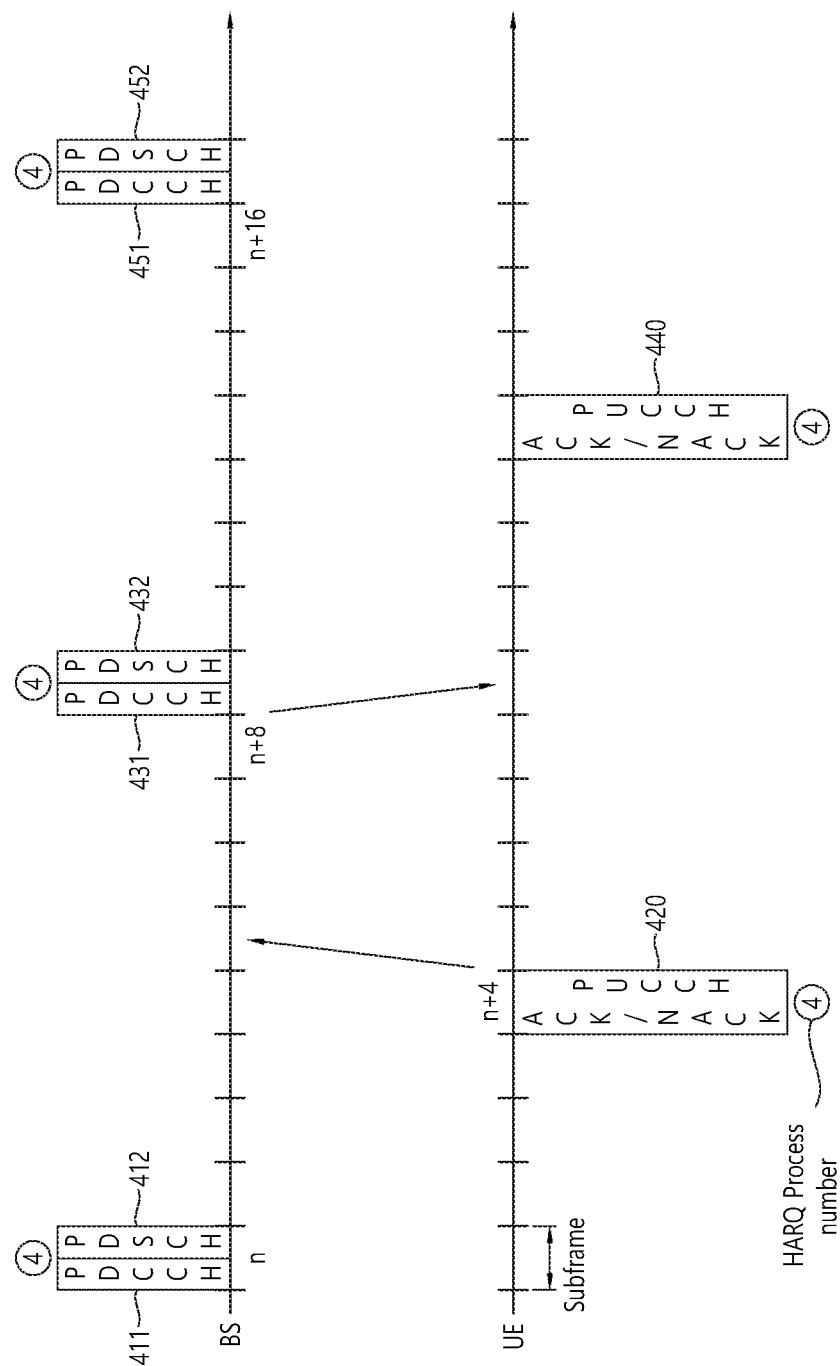
FIG. 9 illustrates a downlink HARQ which is performed by one cell in 3GPP LTE.

FIG. 9 illustrates a downlink HARQ which is performed by one cell in 3GPP LTE.

Referring to FIG. 9, a base station transmits downlink data (e.g., a downlink transmission block) on a PDSCH 412 indicated by allocating a downlink resource on a PDCCH 411 by a subframe n to the terminal.

The terminal sends an ACK/NACK on a PUCCH 420 by an (n+4)-th subframe. For example, a resource of the PUCCH 420 used to transmit the ACK/NACK signal may be determined based on a resource of the PDCCH 411 (e.g., an index of a first CCE used to transmit the PDCCH 411).

Although the base station receives an NACK signal from the terminal, retransmission is not always performed by an (n+8)-th subframe unlike the uplink HARQ. In this case, the retransmission block is transmitted on a PDSCH 432 indicated by allocating an uplink resource on the PDCCH 431 by the (n+9)-th subframe for the illustrative purpose.

The terminal sends the ACK/NACK signal on the PDCCH 440 by an (n+13)-th subframe.

The uplink HARQ includes UL grant transmission of the base station, PUSCH transmission of the terminal (scheduled by the UL grant), and a procedure of transmitting an ACK/NACK with respect to the PUSCH trough the PHICH or transmitting a new UL grant by the base station. The uplink HARQ may be previously determined where an interval between the UL grant and the PUSCH and an interval between the PUSCH and the PHICH (or the UL grant) are 4 ms.

Now, a carrier aggregation system is described. The carrier aggregation system is also called a multiple carrier system.

A 3GPP LTE system supports a case where a DL bandwidth and a UL bandwidth are differently configured, but one component carrier (CC) is a precondition in this case. A 3GPP LTE system supports a maximum of 20 MHz and may be different in a UL bandwidth and a DL bandwidth, but supports only one CC in each of UL and DL A carrier aggregation (also called a bandwidth aggregation or a spectrum aggregation) supports a plurality of CCs. For example, if 5 CCs are allocated as the granularity of a carrier unit having a 20 MHz bandwidth, a maximum of a 100 MHz bandwidth may be supported.

Figure 10:
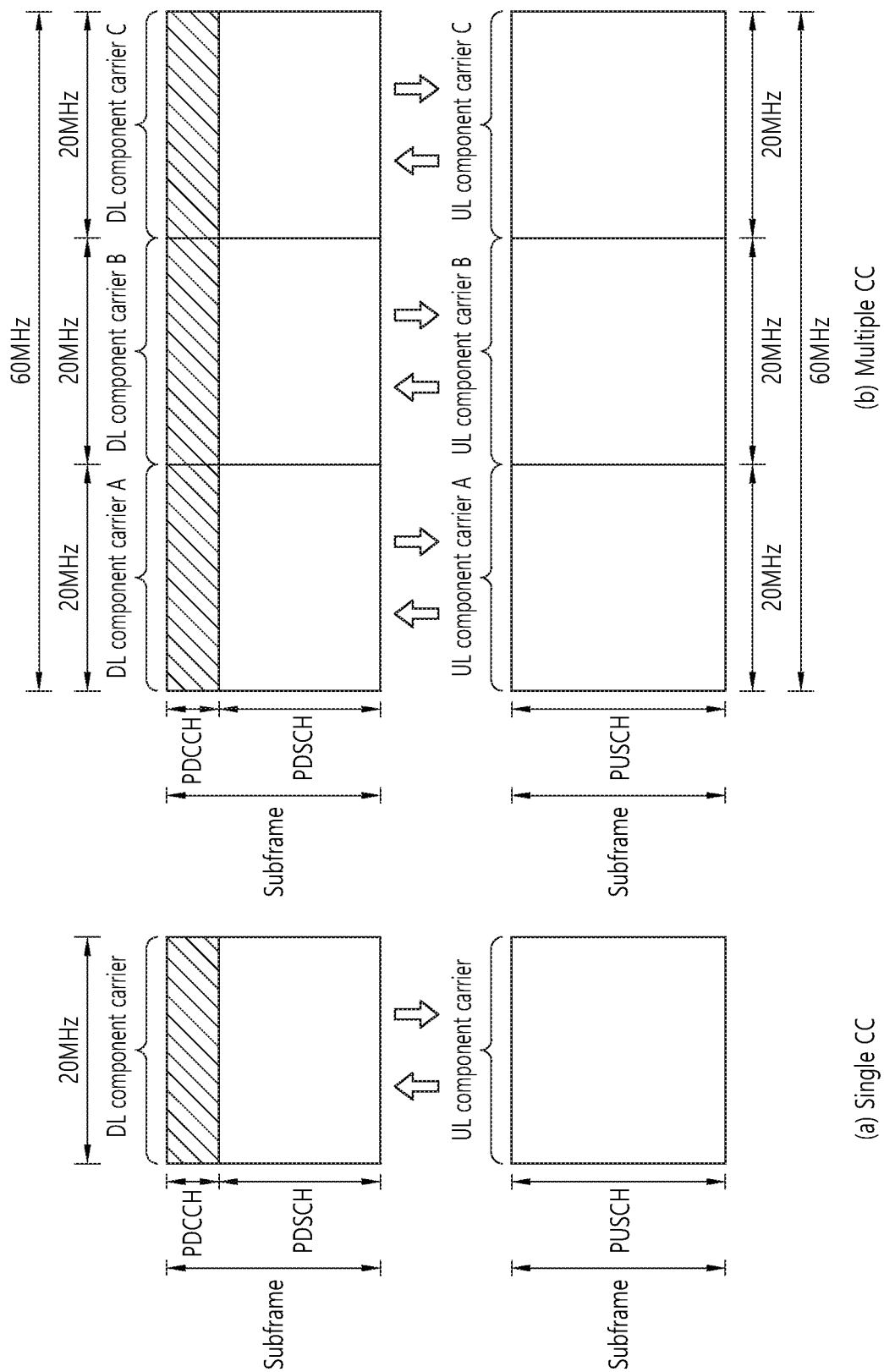
FIG. 10 shows an example of a comparison between a single carrier system and a carrier aggregation system.

FIG. 10 shows an example of a comparison between a single carrier system and a carrier aggregation system.

A carrier aggregation system (FIG. 10 (*b*)) has been illustrated as including three DL CCs and three UL CCs, but the number of DL CCs and UL CCs is not limited. A PDCCH and a PDSCH may be independently transmitted in each DL CC, and a PUCCH and a PUSCH may be independently transmitted in each UL CC. Or, a PUCCH may be transmitted only through a specific UL CC.

Since three pairs of DL CCs and UL CCs are defined, it can be said that a UE is served from three serving cells. Hereinafter, a cell which is configured to provide a service to a user equipment is referred to a serving cell.

The UE may monitor PDCCHs in a plurality of DL CCs and receive DL transport blocks through the plurality of DL CCs at the same time. The UE may send a plurality of UL transport blocks through a plurality of UL CCs at the same time.

A pair of a DL CC #A and a UL CC #A may become a first serving cell, a pair of a DL CC #B and a UL CC #B may become a second serving cell, and a DL CC #C and a UL CC #C may become a third serving cell. Each serving cell may be identified by a cell index (CI). The CI may be unique within a cell or may be UE-specific.

The serving cell may be divided into a primary cell and a secondary cell. The primary cell is a cell on which the UE performs an initial connection establishment procedure or initiates a connection re-establishment procedure, or a cell designated as a primary cell in a handover process. The primary cell is also called a reference cell. The secondary cell may be configured after an RRC connection has been established and may be used to provide additional radio resources. At least one primary cell is always configured, and a secondary cell may be added/modified/released in response to higher layer signaling (e.g., an RRC message). The CI of the primary cell may be fixed. For example, the lowest CI may be designated as the CI of the primary cell.

The primary cell includes a downlink primary component carrier (DL PCC) and an uplink PCC (UL PCC) in view of a CC. The secondary cell includes only a downlink secondary component carrier (DL SCC) or a pair of a DL SCC and a UL SCC in view of a CC.

As described above, the carrier aggregation system may support a plurality of CCs, that is, a plurality of serving cells unlike the single carrier system.

Such a carrier aggregation system may support cross-carrier scheduling. The cross-carrier scheduling is a scheduling method capable of performing resource allocation of a PDSCH transmitted through a different component carrier through a PDCCH transmitted through a specific component carrier and/or resource allocation of a PUSCH transmitted through other component carriers except for a component carrier fundamentally linked with the specific component carrier. That is, the PDCCH and the PDSCH may be transmitted through different DL CCs, and a PUSCH may be transmitted through a UL CC different from a UL CC linked with a DL CC to which a PDCCH including a UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator refers to a carrier indication field (CIF).

The carrier aggregation system that supports the cross-carrier scheduling may include a carrier indication field (CIF) to the conventional downlink control information (DCI). In a system that supports the cross-carrier scheduling, for example, LTE-A system, 3 bits may be extended since the CIF is added to the conventional DCI format (i.e., the DCI format used in LTE), and the PDCCH structure may reuse the conventional coding method, resource allocation method (i.e., resource mapping based on the CCE), and the like.

A BS may set a PDCCH monitoring DL CC (monitoring CC) group. The PDCCH monitoring DL CC group is configured by a part of all aggregated DL CCs. If the cross-carrier scheduling is configured, the UE performs PDCCH monitoring/decoding for only a DL CC included in the PDCCH monitoring DL CC group. That is, the BS transmits a PDCCH with respect to a PDSCH/PUSCH to be scheduled through only the DL CCs included in the PDCCH monitoring DL CC group. The PDCCH monitoring DL CC group may be configured in a UE-specific, UE group-specific, or cell-specific manner.

Non-cross carrier scheduling (NCSS) is a scheduling method capable of performing resource allocation of a PDSCH transmitted through a specific component carrier through a PDCCH transmitted through the specific component carrier and/or resource allocation of a PDSCH transmitted through a component carrier fundamentally linked with the specific component carrier.

ACK/NACK transmission for HARQ in 3GPP LTE Time Division Duplex (TDD) is described below.

In TDD, unlike in a Frequency Division Duplex (FDD), a DL subframe and an UL subframe coexist in one radio frame. In general, the number of UL subframes is smaller than that of DL subframes. Accordingly, in preparation for a case where UL subframes for sending an ACK/NACK signal are not sufficient, a plurality of ACK/NACK signals for DL transport blocks received in a plurality of DL subframes is transmitted in one UL subframe.

In accordance with section 10.1 of 3GPP TS 36.213 V8.7.0 (2009-05), two ACK/NACK modes: ACK/NACK bundling and ACK/NACK multiplexing are initiated.

In ACK/NACK bundling, UE sends ACK if it has successfully decoded all received PDSCHs (i.e., DL transport blocks) and sends NACK in other cases. To this end, ACK or NACKs for each PDSCH are compressed through logical AND operations.

ACK/NACK multiplexing is also called ACK/NACK channel selection (or simply channel selection). In accordance with ACK/NACK multiplexing, UE selects one of a plurality of PUCCH resources and sends ACK/NACK.

A following table 5 illustrates a DL subframe n-k associated with a UL subframe n according to a UL-DL configuration in 3GPP LTE. In this case, k∈K and the M represents the number of components of a group K (hereinafter, the K represents a group including k, and the M represents the number of components of a group K). That is, when the data are received by the DL subframe n-k, the ACK/NACK for the data is transmitted by the UL subframe n. The table 5 represents k values with respect to each UL subframe n, respectively. The table 5 represents a relationship between a downlink subframe receiving a data channel and an uplink subframe transmitting an ACK/NACK for the data channel when one cell, for example, only a primary cell is configured in the terminal.

TABLE 5

| UL-DL config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In an LTE-A Rel 10 system, one terminal may transmit/receive data through a plurality of cells which are aggregated. In this case, a control signal for scheduling/controlling a plurality of cells may be transmitted through a DL CC of only a specific cell or a DL CC of each cell. The former may refer to a cross carrier scheduling and the latter may refer to a non-cross carrier scheduling.

Hereinafter, a CC to which the control signal is transmitted may refer to a scheduling CC and a remaining CC may refer to a scheduled CC. In a downlink, the scheduling CC is the same as the scheduled CC in the non-cross carrier scheduling. The scheduling CC may differ from the scheduled CC in the cross carrier scheduling.

For example, the scheduling CC includes a primary CC (PCC). The PCC serves as a CC for transmitting an uplink control signal. A CC except for the PCC refers to a SCC. Hereinafter, the PCC is used as a representative example of the scheduling CC, and the SCC is used as a representative example of the scheduled CC. However, the present invention is not limited thereto.

Meanwhile, the terminal operating in the LTE-A Rel 10 system may aggregate only CCs including the same frame structure. Further, when the terminal aggregates a plurality of TDD CCs, only CCs having the same UL-DL configuration may be used. In addition, when the non-cross carrier scheduling is used, a timing relationship defined in one CC is simply enlarged and applied in a plurality of CCs.

However, in a next wireless communication system, aggregated CCs may use different frame structures. For example, the FDD CC and the TDD CC may be aggregated.

Figure 11:
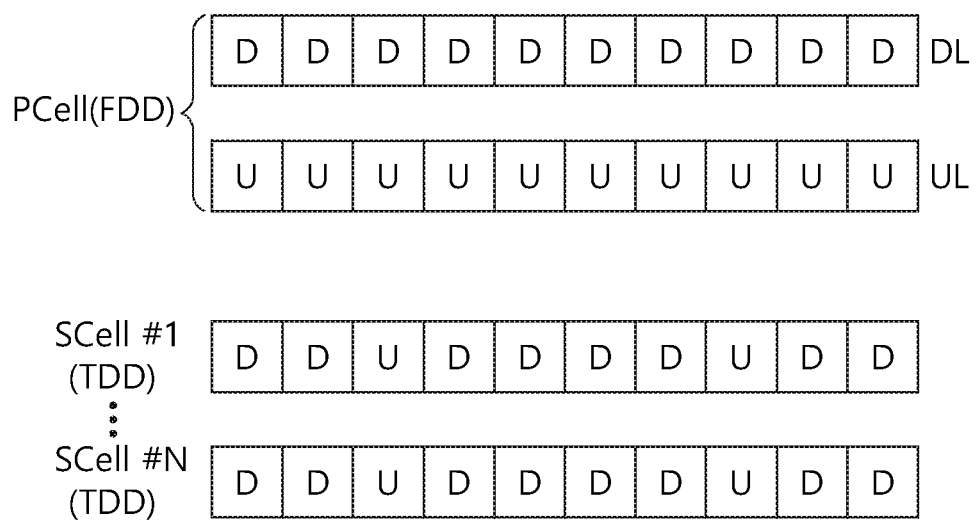
FIG. 11 illustrates an example where a plurality of serving cells uses different types of radio frames.

FIG. 11 illustrates an example where a plurality of serving cells uses different types of radio frames.

Referring to FIG. 11, a primary cell PCell and a plurality of secondary cells SCell #1, . . . , SCell #N may be configured in the terminal. In this case, the primary cell may be operated as an FDD and use the FDD frame, and the secondary cells may be operated as the TDD and use the TDD frame. The same UL-DL configuration may be used in a plurality of secondary cells. Since the primary cell is the FDD cell, a ratio of a downlink subframe (expressed by D) to an uplink subframe (expressed by U) is 1:1. However, since the secondary cells are the TDD cell, a ratio of a downlink subframe to an uplink subframe may be different from 1:1.

Figure 12:
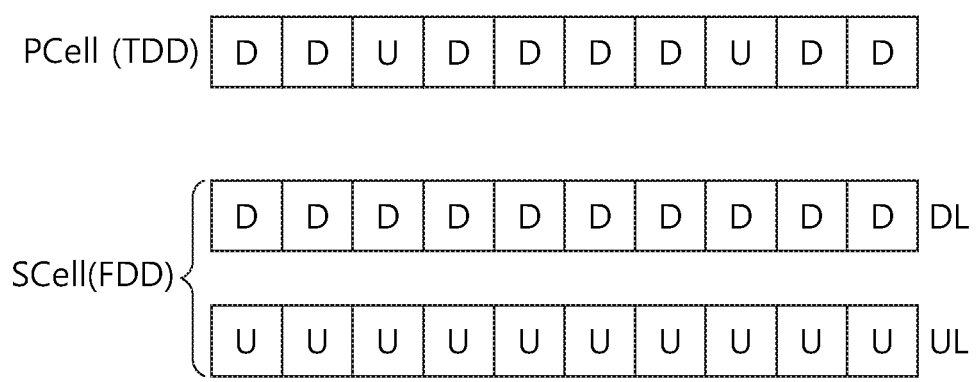
FIG. 12 illustrates another example where a plurality of serving cell uses different types of radio frames in a wireless communication system.
Figure 13:
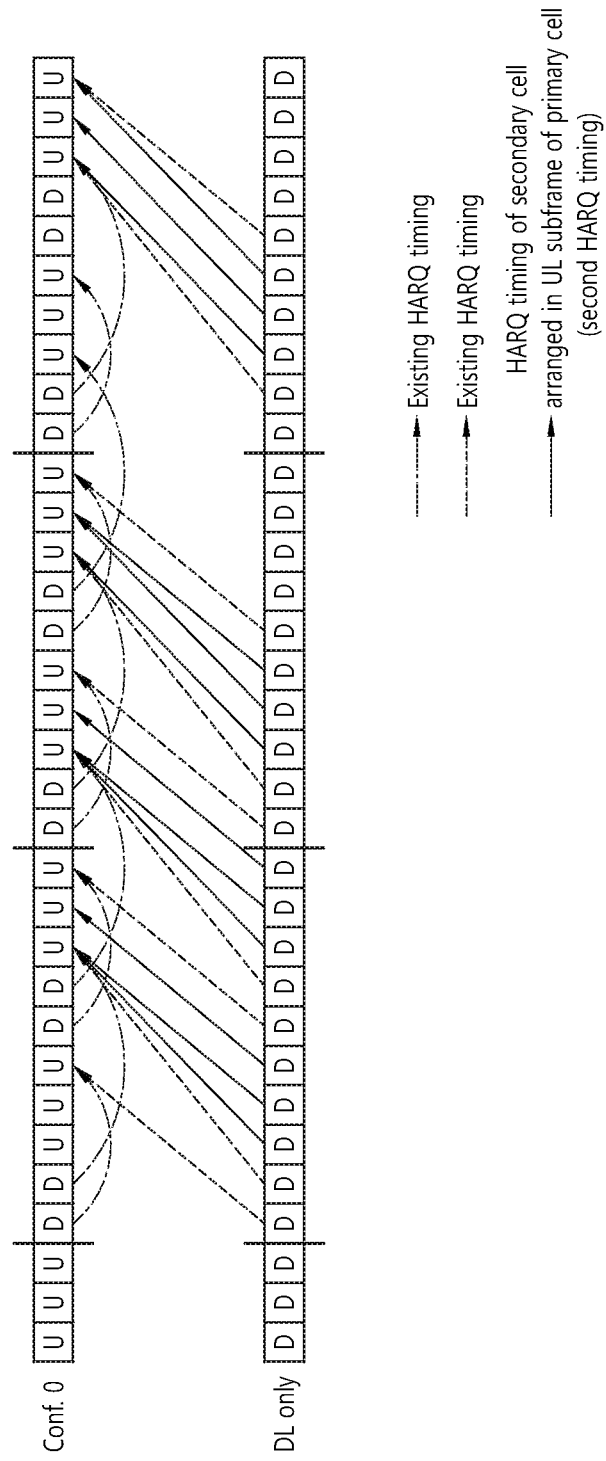
FIG. 13 to FIG. 20 illustrates an HARQ timing according to the first embodiment and an HARQ timing according to the second embodiment.
Figure 14:
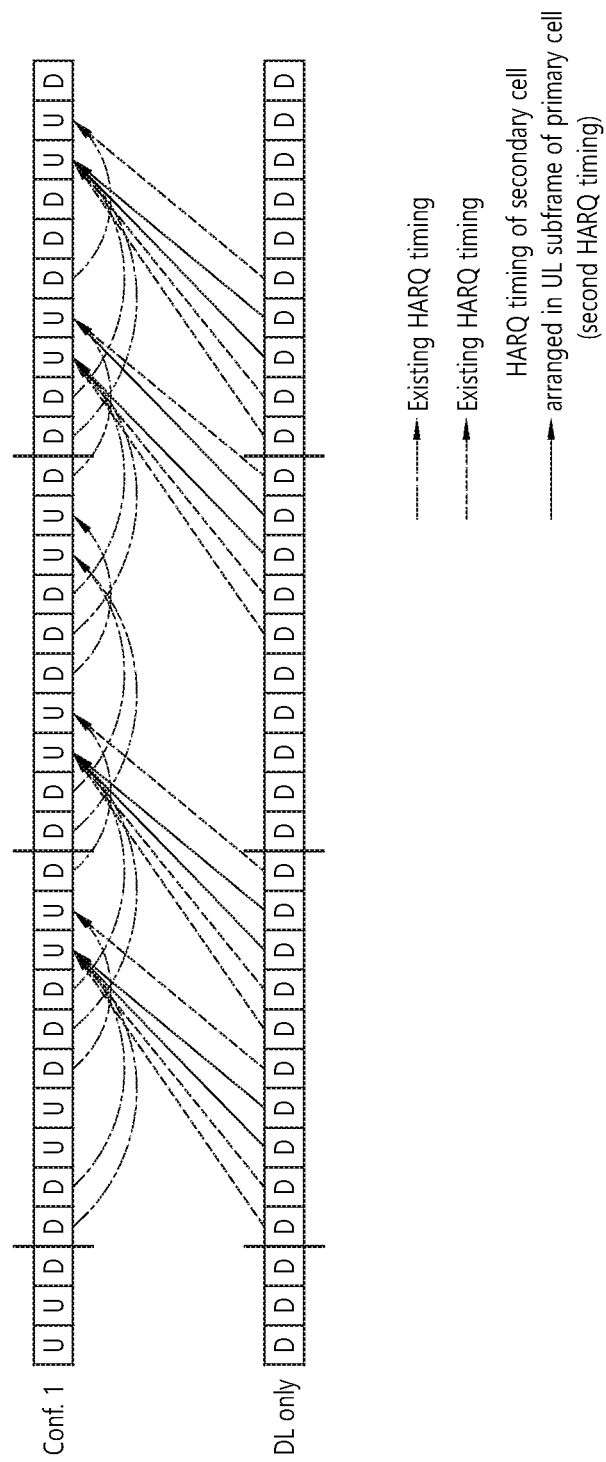
Figure 15:
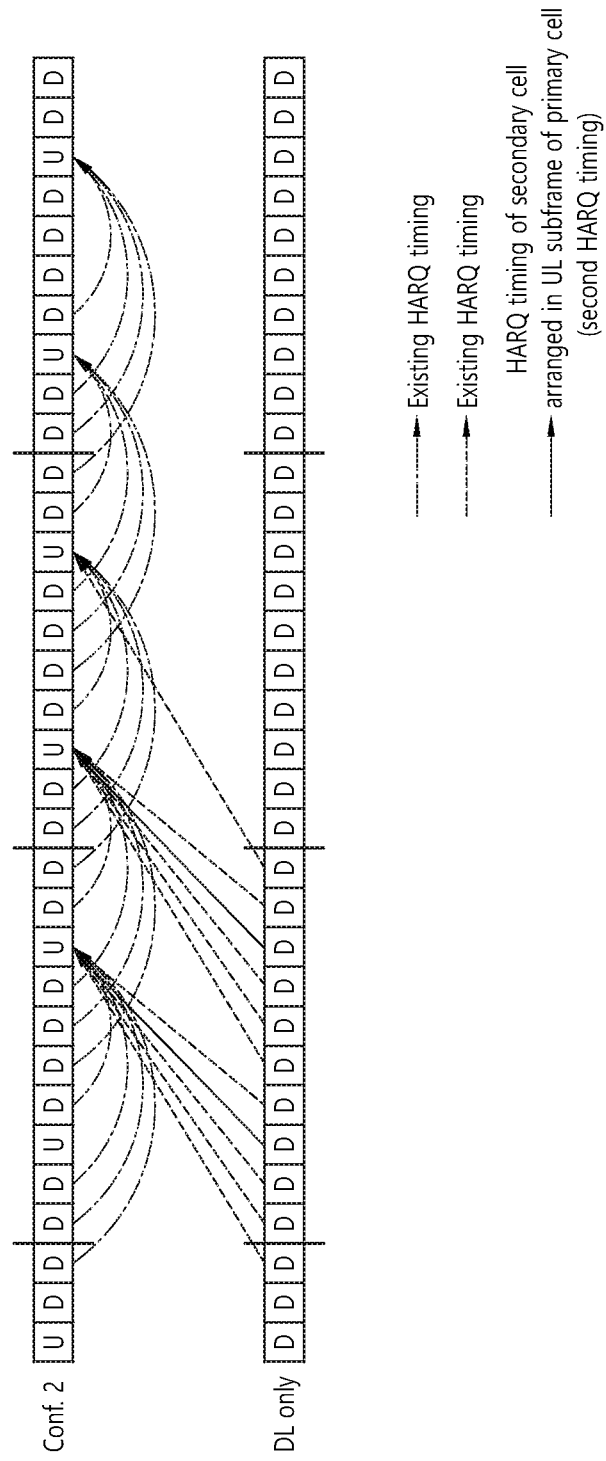
Figure 16:
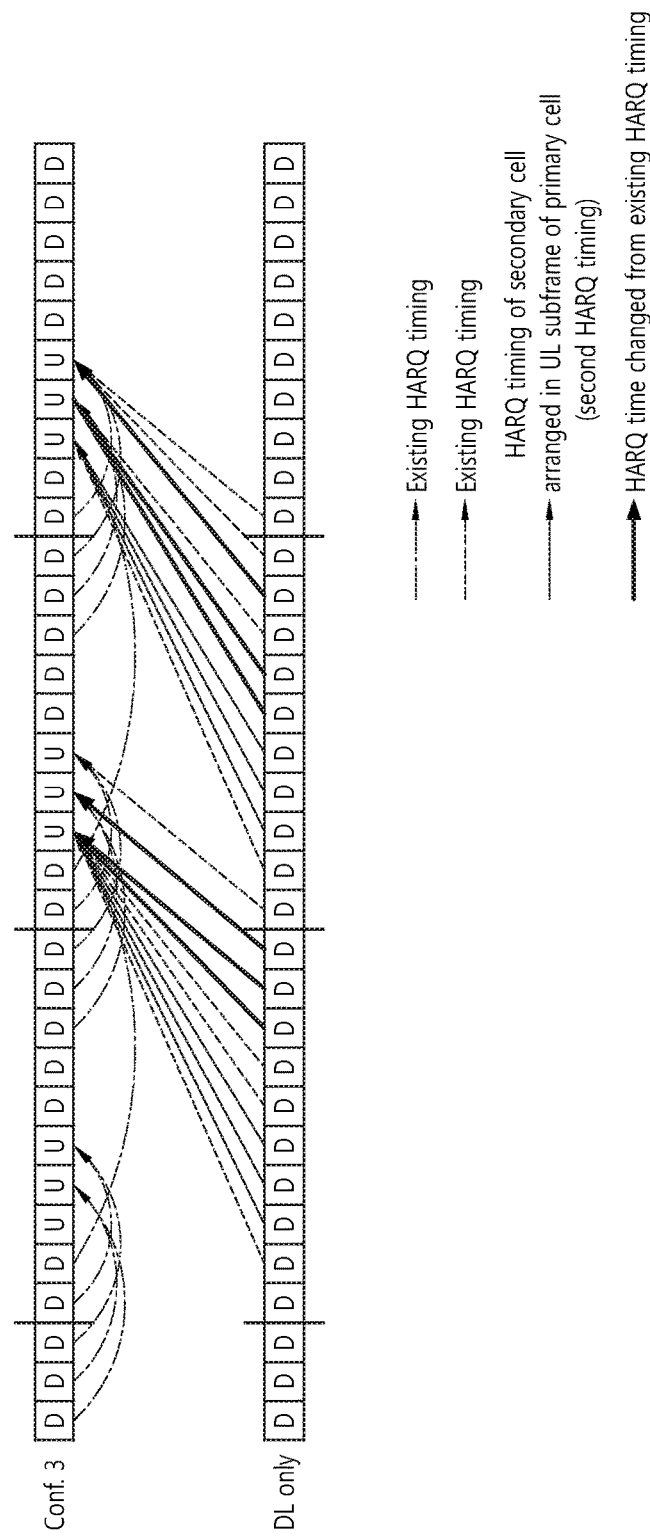
Figure 17:
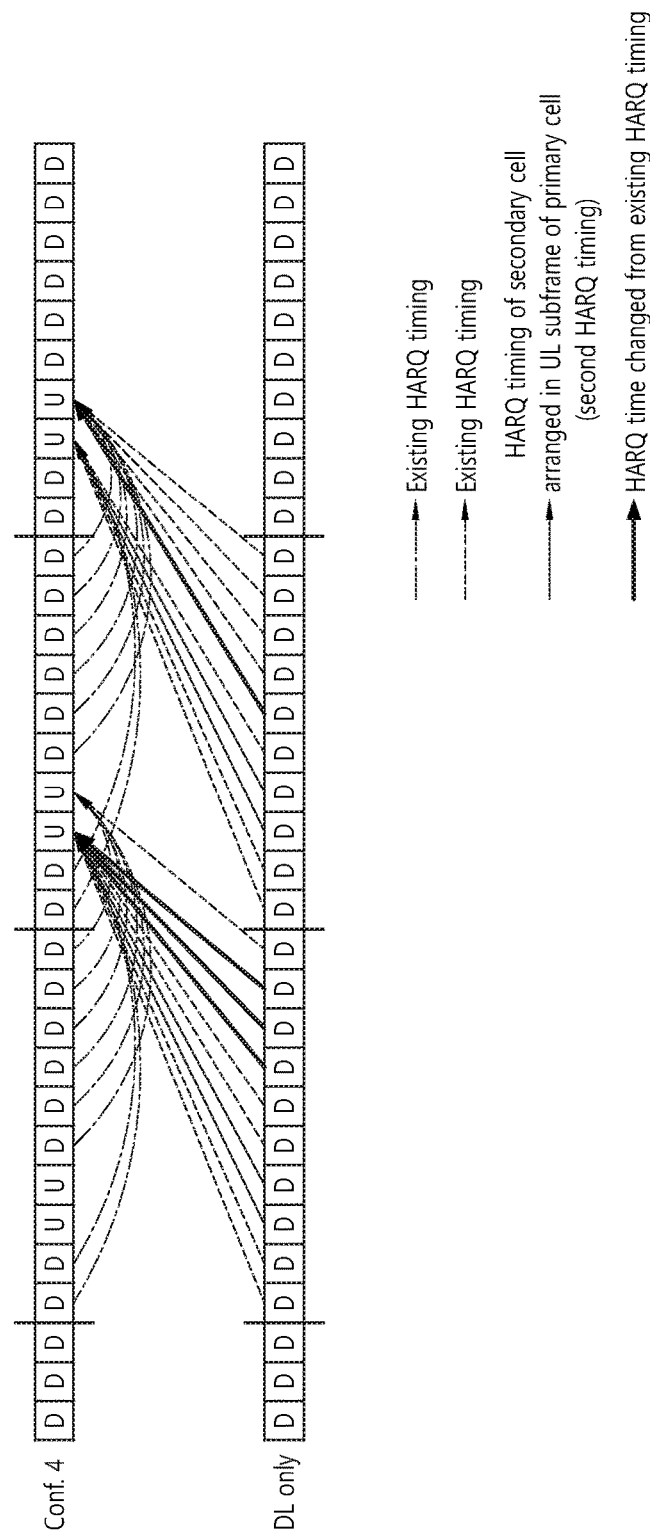
Figure 18:
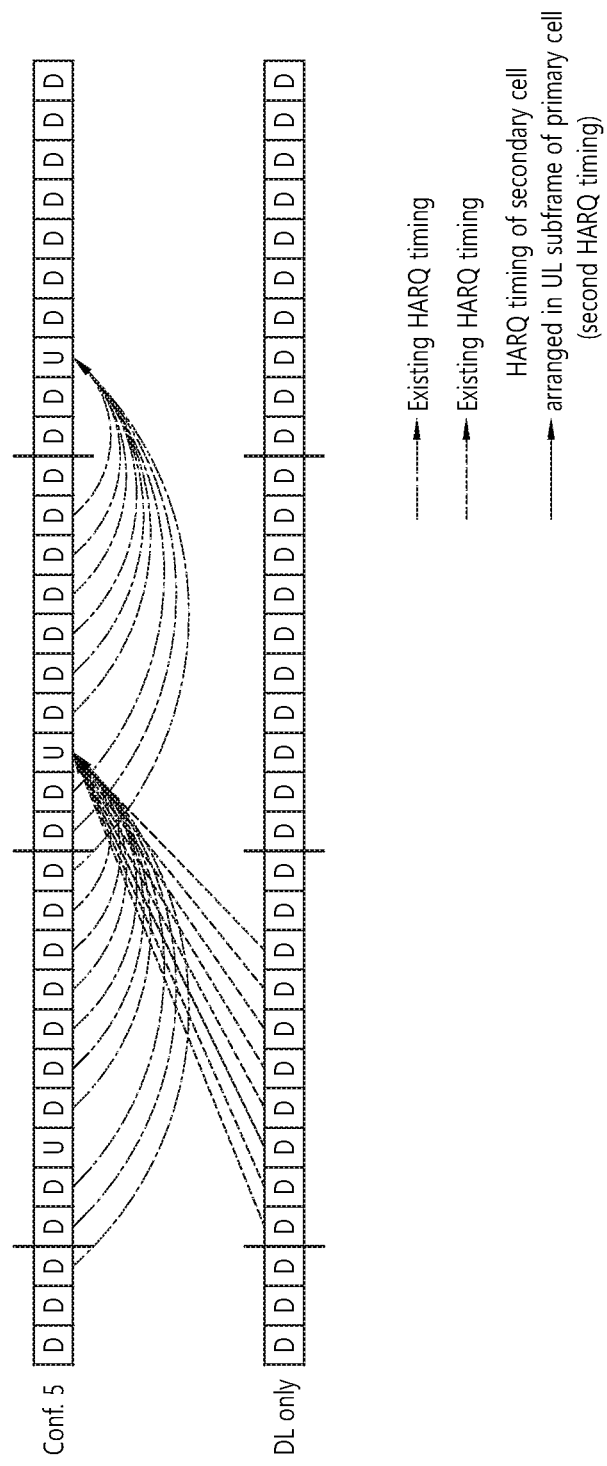
Figure 19:
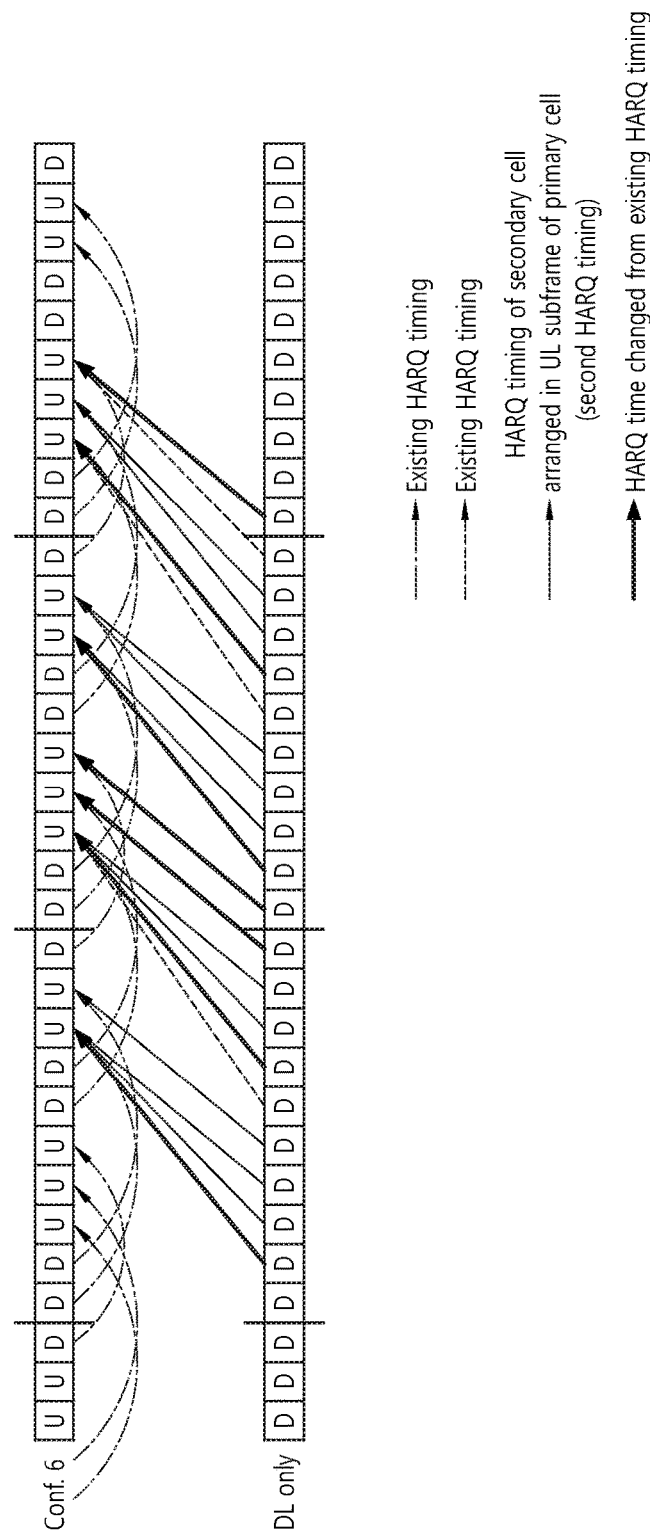
Figure 20:
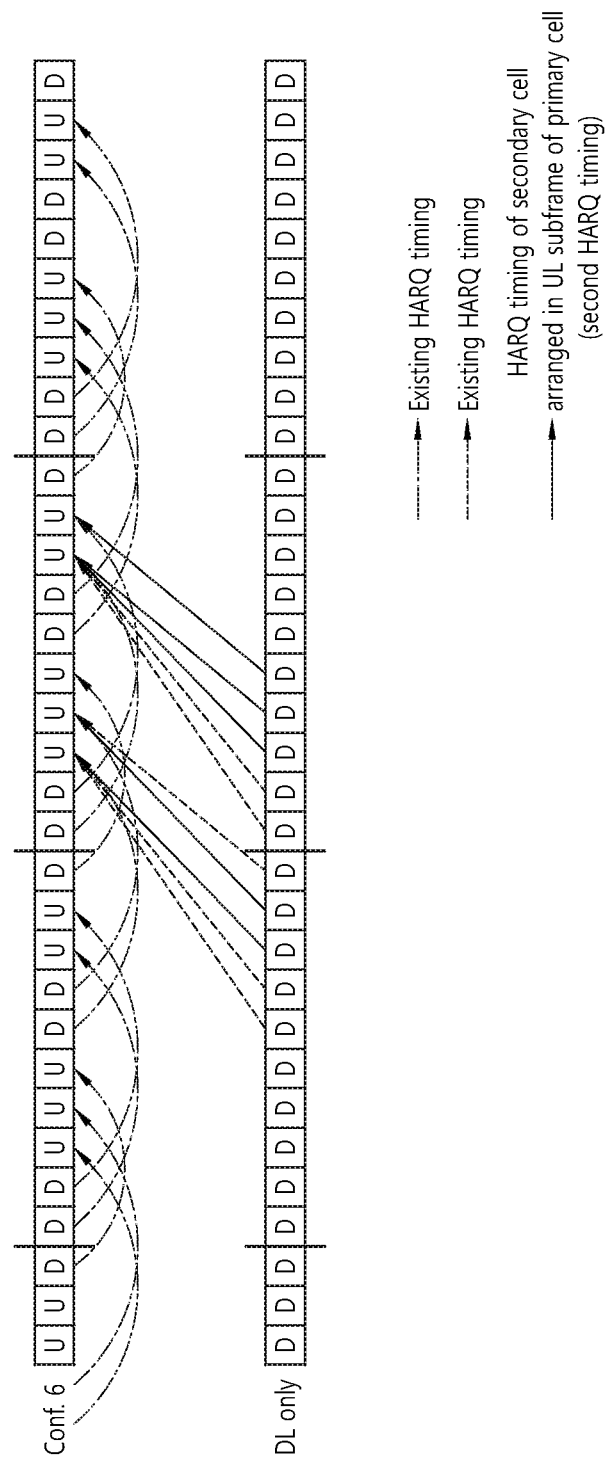

FIG. 12 illustrates another example where a plurality of serving cell uses different types of radio frames in a wireless communication system.

Referring to FIG. 12, a primary cell PCell using a TDD frame and secondary cells SCell using an FDD frame may be configured in the terminal.

Hereinafter, the present invention will be described.

As described above, in a carrier aggregation system, one terminal may transmit/receive data/control information using a plurality of cells. The terminal uses one initially access cell as a primary cell and uses a cell additionally configured through the primary cell as a secondary cell.

The primary cell is used for an operation for maintaining connection between the base station and the terminal. For example, operations such as radio link management (RLM), radio resource management (RRM), reception of system information, transmission of a physical random access channel (PRACH) and transmission of the PUCCH may be performed by the primary cell. Meanwhile, the secondary cell is mainly used to transmit a data channel or scheduling information for the data channel.

The primary cell and the secondary cell are UE-specific. When a plurality of cells is included in a system, cells may be used as the primary cell or the secondary cell, respectively, and each terminal uses one of a plurality of cells as the primary cell. That is, an optional cell may serve as the primary cell or the secondary cell. Accordingly, all cells are configured to perform an operation of the primary cell.

In other words, all cells implement transmission of a synchronization signal, transmission of a broadcast channel, transmission of a CRS, and configuration of a PDCCH region. The above cell may refer to a backward compatible cell or may refer to a legacy carrier type (LCT) in a carrier aspect.

Meanwhile, if the cell is used as the secondary cell in a next wireless communication system, the introduction of a cell removing a part of the whole of unnecessary information is considered. The above cell may not be backward compatible and may refer to a new carrier type or extension carrier (NCT) as compared with an LCT.

For example, in the NCT, the CRS is not transmitted every subframe but is transmitted in only a partial time domain or only a frequency domain, or a DL control channel region such as an existing PDCCH is removed or a partial time domain and the frequency domain are reduced so that UE-specific DL control channel region may be newly configured.

The NCT may be a carrier capable of performing only downlink transmission. Hereinafter, the carrier capable of performing only downlink transmission refers to a DL dedicated carrier for the purpose of convenience.

The DL dedicated carrier may be configured in various schemes. For example, the DL dedicated carrier in the FDD may be a cell including only a DL CC. That is, the DL dedicated carrier in the FDD may be a DL CC which does not include a UL CC. Alternatively, a DL CC including a UL CC linked with a system information block (SIB) may use only a DL CC without using the UL CC to configure the DL dedicated carrier.

The DL dedicated carrier in the TDD may be generated by applying a UL-DL configuration of the table 1 to use only a DL subframe according to a corresponding UL-DL configuration. The LCT is included by time-dividing the UL subframe/DL subframe into one frame according to the UL-DL configuration. Unlike the LCT, the DL dedicated carrier includes only a DL subframe in the NCT. However, the above method does not use a subframe to be configured as the UL subframe according to the UL-DL configuration so that resource consumption occurs.

Accordingly, when the TDD uses the DL dedicated carrier, it is preferable that all subframes in a frame are configured by only the DL subframe.

To this end, as illustrated in a following table 6, an additional UL-DL configuration may be added to an existing UL-DL configuration. The table 6 illustrates an example of a UL-DL configuration according to the present invention.

TABLE 6

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 7 | — | D | D | D | D | D | D | D | D | D | D |

In the table 6, UL-DL configurations 0 to 6 are the same as the existing UL-DL configuration, and a UL-DL configuration 7 is added. The UL-DL configuration 7 represents that all subframes in the frame are configured by a DL subframe. The UL-DL configuration 7 may be limited not to be used in the primary cell but to be used in only the secondary cell. In other words, the DL dedicated carrier may be limited to be used in a frequency band (secondary cell) different from that of an existing TDD primary cell in order to prevent interference between frequency bands.

The above method may be a method of defining the UL-DL configuration 7 to directly notify the defined UL-DL configuration 7 to the terminal in order to configure the DL dedicated carrier.

When the primary cell operating according to a UL-DL configuration of the TDD and a FDD cell (or FDD cell using a DL dedicated carrier) using an FDD frame are aggregated, transmission directions in the aggregated cells may be different from each other in the same subframe. For example, a subframe N of the TDD primary cell is an uplink subframe and a transmission direction thereof may be an uplink but a subframe N of the FDD secondary cell is a downlink subframe and a transmission direction thereof may be a downlink. ACK/NACK transmission with respect to PDSCH reception in the secondary cell may be performed by the primary cell, the ACK/NACK may be transmitted according to an HARQ timing determined according to the UL-DL configuration of the primary cell. That is, an ACK/NACK response timing in a primary cell with respect to a PDSCH received by the secondary cell may be determined based on the table 5.

An ACK/NACK for a downlink subframe at the same time as that of a downlink subframe of a TDD primary cell among downlink subframes of the FDD secondary cell depends on an HARQ timing of the TDD primary cell. However, it is unclear when an ACK/NACK for a downlink subframe at the same time as that of an uplink subframe of the TDD primary cell is transmitted.

Hereinafter, a method of configuring a DL HARQ timing with respect to a case of transmitting an ACK/NACK for a DL subframe of the secondary cell (or a data unit received by the DL subframe) by a UL subframe of the primary cell will be described.

Hereinafter, it is assumed that the primary cell is a TDD cell and the secondary cell is an FDD cell. However, the above method is applicable if the FDD cell does not depend on a HARQ timing applied when the FDD cell is used alone even if the FDD cell is either the primary cell or the secondary cell.

First Embodiment

With respect to entire DL subframes of the secondary cell, an ACK/NACK may be transmitted by a UL subframe of a primary cell at the fastest timing satisfying a minimum time (kmin=4) required to transmit the ACK/NACK after reception of data. Only when the UL-DL configuration of the primary cell includes UL-DL configurations 0, 1, 2, and 5, the above method is applicable.

When the TDD primary cell is used alone, the ACK/NACK is transmitted according to an HARQ timing (hereinafter referred to as 'first HARQ timing') of the table 5. When the FDD secondary cell is aggregated and data are received by the FDD secondary cell, the HARQ timing is required in addition the first HARQ timing. Hereinafter, the additional HARQ time refers to a second HARQ timing.

The first HARQ timing and the second HARQ timing by UL-DL configurations of the TDD primary cell are expressed by a following table 7. In a following table 7, parts marked with '[ ]' represent the second HARQ timing.

TABLE 7

| UL-DL Conf. | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, [5, 4] | [4] | 4 | — | — | 6, [5, 4] | [4] | 4 |
| 1 | — | — | 7, 6, [5, 4] | 4 | — | — | — | 7, 6, [5, 4] | 4 | — |
| 2 | — | — | 8, 7, 4, 6, [5] | — | — | — | — | 8, 7, 4, 6, [5] | — | — |
| 3 | — | — | 7, 6, 11, [10, 9, 8] | 6, 5 | 5,4 | — | — | — | — | — |
| 4 | — | — | 12, 8, 7, 11, [10, 9] | 6, 5, 4, 7 | — | — | — | — | — | — |
| 5 | — | — | 13, 12, 9, 8, 7, 5, 4, 11, 6, [10] | — | — | — | — | — | — | — |
| 6 | — | — | 7, [5, 4] | 7 | 5 | — | — | 7, [5, 4] | 7, [4] | — |

Second Embodiment

An HARQ timing may be configured so that the number of DL subframes corresponding to an UL subframe transmitting the ACK/NACK for entire DL subframes of the secondary cell is uniformly distributed if possible. The number of ACK/NACKs transmitted by each UL subframe of the primary cell is not concentrated into a specific UL subframe but is uniformly distributed to all UL subframes if possible (that is, uniform distribution). The ACK/NACK is transmitted without exclusion by a UL subframe of a primary cell of the fastest timing satisfying a minimum time $k_{min}=4$ required to transmit the ACK/NACK after receiving data by a DL subframe of the secondary cell.

A load is efficiently dispersed by uniformly distributing the ACK/NACK bit number transmitted by each UL subframe through uniform distribution if possible.

When a PDSCH-ACK/NACK timing at a minimum interval considering only a required minimum time $k_{min}$ without considering the uniform distribution as a detailed rule of the uniform distribution is configured, a PDSCH having the greatest k value is determined as a reference timing and the uniform distribution is applied to remaining PDSCHs, and an ACK/NACK for a preceding PDSCH is controlled not to be provided after an ACK/NACK for a post PDSCH.

When the UL-DL configuration of the primary cell includes UL-DL configurations 0, 1, 2, and 5, the existing TDD UL-DL timing is maintained. The above method is applicable to only the UL-DL configuration 6. When the above method is applied to the UL-DL configuration 6, the ACK/NACK delay may be reduced.

According to the second embodiment, the first HARQ timing and the second HARQ timing may be expressed by a following table 8. In a following table 8, parts marked with [ ]' represent the second HARQ timing.

TABLE 8

| UL-DL Conf. | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, [5] | [5, 4] | 4 | — | — | 6, [5] | [5, 4] | 4 |
| 1 | — | — | 7, 6, [5] | 4, [5] | — | — | — | 7, 6, [5] | 4, [5] | — |
| 2 | — | — | 8, 7, 4, 6, [5] | — | — | — | — | 8, 7, 4, 6, [5] | — | — |
| 3 | — | — | 7, 6, 11, [10] | 6, 5, [10] | 5, 4, [10] | — | — | — | — | — |
| 4 | — | — | 12, 8, 7, 11, [10] | 6, 5, 4, 7, [10] | — | — | — | — | — | — |
| 5 | — | — | 13, 12, 9, 8, 7, 5, 4, 11, 6, [10] | — | — | — | — | — | — | — |
| 6 | — | — | 7, [8] | 7, [6] | 5, [6] | — | — | 7, [5] | 7, [5] | — |

Alternatively, according to the second embodiment, the first HARQ timing and the second HARQ timing may be expressed by a following table 9. In the following table 9, parts marked with '[ ]' represent the second HARQ timing.

TABLE 9

| UL-DL Conf. | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, [5] | [5, 4] | 4 | — | — | 6, [5] | [5, 4] | 4 |
| 1 | — | — | 7, 6, [5] | 4, [5] | — | — | — | 7, 6, [5] | 4, [5] | — |
| 2 | — | — | 8, 7, 4, 6, [5] | — | — | — | — | 8, 7, 4, 6, [5] | — | — |
| 3 | — | — | 7, 6, 11, [10, 9, 8] | 6, 5 | 5,4 | — | — | — | — | — |
| 4 | — | — | 12, 8, 7, 11, [10, 9] | 6, 5, 4, 7 | — | — | — | — | — | — |
| 5 | — | — | 13, 12, 9, 8, 7, 5,4, 11, 6, [10] | — | — | — | — | — | — | — |
| 6 | — | — | 7, [8] | 7, [6] | 5, [6] | — | — | 7 | 7, [6, 5] | — |

FIG. 13 to FIG. 20 illustrates an HARQ timing according to the first embodiment and an HARQ timing according to the second embodiment.

FIG. 13 to FIG. 20 illustrates an HARQ timing of a secondary cell arranged in a UL subframe of a primary cell transmitting a PUCCH, an existing HARQ timing, and a changed HARQ timing of the existing HARQ timing. The HARQ timing of a secondary cell arranged in a UL subframe of a primary cell includes both of an HARQ timing according to the first embodiment and an HARQ timing according to the second embodiment.

Figure 21:
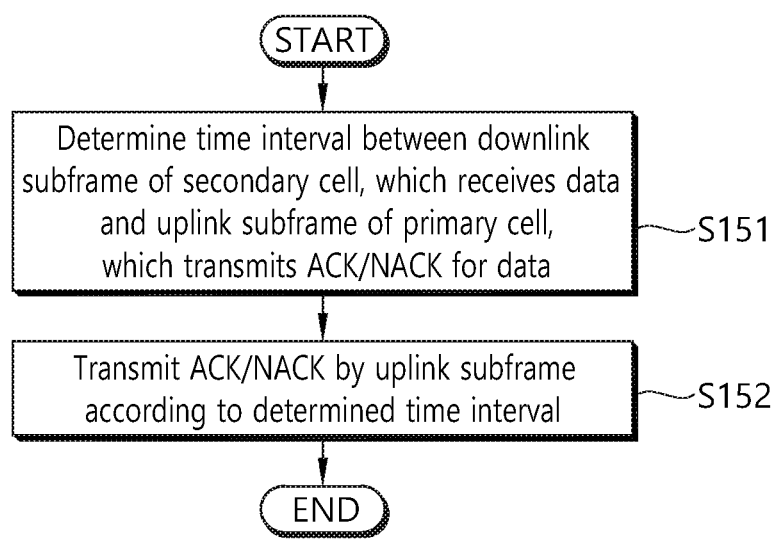
FIG. 21 is a flowchart illustrating a method of transmitting an ACK/NACK according to an embodiment of the present invention.

FIG. 21 is a flowchart illustrating a method of transmitting an ACK/NACK according to an embodiment of the present invention.

Referring to FIG. 21, a terminal determines a time interval between a downlink subframe of a secondary cell, which receives data and an uplink subframe of a primary cell, which transmits an ACK/NACK for the data (S151). The time interval between the downlink subframe and the uplink subframe is determined by the first HARQ timing or the second HARQ timing. As described above, the first HARQ timing is an HARQ timing which is applied when the primary cell is used alone, which is expressed in the table 5. The second HARQ timing is an HARQ timing which is additional to the first HARQ timing and was described in the above tables 7, 8, and 9 (following tables 10 and 10 may be an example).

The terminal transmits an ACK/NACK by the uplink subframe according to the determined time interval (S152).

Meanwhile, when the UL-DL configuration of the primary cell is an UL-DL configuration 6, the uniform distribution scheme is applicable so that a time interval between a PDSCH received by the secondary cell and an ACK/NACK transmitted from the primary cell becomes 5 ms or less.

The second HARQ timing which is additional to the first HARQ timing of the table 5 may be expressed by a following table 10.

TABLE 10

| UL-DL Conf. | Subframe n | | | | | | | | | |
|---|---|---|---|---|---|---|---|---|---|---|
| | 0 | 1 | 2 | 3 | 4 | 5 | 6 | 7 | 8 | 9 |
| 6 | — | — | 7, [5] | 7,[5] | 5 | — | — | 7, [5, 4] | 7, [4] | — |

When the FDD secondary cell is aggregated in the TDD primary cell, the second HARQ timing may be always added to the first HARQ timing.

Alternatively, the presence of additional application of the second HARQ timing may be signaled to the terminal by the base station. The presence of additional application of the second HARQ timing may be directly signaled to L1, L2, and L3 using an RRC or a PDCCH. Alternatively, the presence of additional application of the second HARQ timing may be indirectly signaled associated with the RRC configuration. For example, the presence of the application of the second HARQ timing may be determined according to which one of a PUCCH format 3 or channel selection is configured. That is, only when the PUCCH format 3 is configured, the second HARQ timing is additionally applied. When the channel selection is configured, only the first HARQ timing is applied but the second HARQ may not be additionally applied.

The second HARQ timing may be restrictively and additionally applied in only the UL-DL configuration where an uplink subframe of M>4 is generated. When the UL-DL configuration of the primary cell is a UL-DL configuration 5, since only a PUCCH format 3 may be always used, the second HARQ timing may be always added.

Meanwhile, it is assumed that a first PDSCH is received by a first subframe of a secondary cell, and a second PDSCH is received by a second subframe of the secondary cell when the UL-DL configuration of the primary cell includes UL-DL configurations 3,4, and 6. Here, the first subframe is a subframe before the second subframe. In this case, an ACK/NACK reversal phenomenon where an ACK/NACK for the first PDSCH is transmitted after an ACK/NACK for the second PDSCH may be generated. Accordingly, since the complexity of scheduling of the base station may be increased, in order to prevent this, although uniform distribution is not performed, a method of avoiding a reversal phenomenon of the ACK/NACK may be considered. According to the above method, HARQ-ACK transmission in a faster timing may be performed.

When the TDD primary cell and the FDD secondary cell are aggregated, a UL-DL configuration of the TDD primary cell becomes a DL reference UL-DL configuration with respect to the FDD secondary cell. That is, an ACK/NACK for data (a PDSCH or a transmission block) received by a downlink subframe of the FDD secondary cell is transmitted through an uplink subframe of the TDD primary cell. The uplink subframe is determined based on the DL reference UL-DL configuration. In this case, the DL reference UL-DL configuration means a UL-DL configuration of the TDD primary cell.

When the UL-DL configuration of the primary cell includes UL-DL configurations 3, 4, and 6, a second HARQ timing illustrated in a following table 10 may be added to the first HARQ illustrated in the table 5. The first HART timing is not illustrated in the following table 11.

TABLE 11

| DL-reference UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | — | — | 10, 9, 8 | — | — | — | — | — | — | — |
| 4 | — | — | 10, 9 | — | — | — | — | — | — | — |
| 6 | — | — | 8 | 6 | 6 | — | — | — | 6, 5 | — |

If the UL-DL configuration of the primary cell includes UL-DL configurations 3, 4, and 6, the first HARQ timing and the second HARQ timing are simultaneously expressed as follows.

TABLE 12

| DL-reference UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | — | — | 11, 10, 9, 8, 7, 6 | 6, 5 | 5, 4 | — | — | — | — | — |
| 4 | — | — | 12, 11, 10, 9, 8, 7 | 7, 6, 5, 4 | — | — | — | — | — | — |
| 6 | — | — | 8, 7 | 7, 6 | 6, 5 | — | — | 7 | 7, 6, 5 | — |

Meanwhile, the reference UL-DL configuration for the HARQ timing is applicable to the TDD secondary cell. The reference UL-DL configuration may include a UL-DL configuration used to transmit the ACK/NACK. In this case, when a group K determined with respect to the reference UL-DL configuration applied to the TDD secondary cell is $K_{Scell}$ and a group K determined with respect to the UL-DL configuration applied to the TDD secondary cell is $K_{Pcell}$, the $K_{Scell}$ may be different from the $K_{Pcell}$.

If the cross carrier scheduling is applied, the primary cell may schedule the secondary cell. The HARQ timing of the secondary cell is applied according to the group $K_{Scell}$. When an implied PUCCH resource of the primary cell is mapped to a component $k^{Scell}_n$ of the group $K_{Scell}$ having the same value as that of a component $k^{Pcell}_m$ of the $K_{Pcell}$ in the same UL subframe of the primary cell and the secondary cell (e.g, in a case of a basic antenna port, $n^{(1,p)}_{PUCCH}=(M-m-1) \cdot N_c + m \cdot N_{c+1} + n_{CCE,m} + N^{(1)}_{PUCCH}$), and the m of the $k^{Pcell}_m$ is applied.

For example, when the primary cell uses the UL-DL configuration 2 and the reference UL-DL configuration of the secondary cell is the UL-DL configuration 1, $k^{Scell}_0=7$ and $k^{Pcell}_1=7$ in the UL subframe 2 so that m=1 is applied.

Meanwhile, when K' is configured separately from an existing $K_{Pcell}$ so that a PUCCH format 1a/1b corresponds to a DL subframe n-$k_m$' indicated by $k_m$, of the newly added K', corresponding implied mapping may be configured (toward a center of a band) after the implied PUCCH resource corresponding to the existing group $K_{Pcell}$. That is, the correspondence of the m value may be configured after an existing value. The above method does not change an existing $M_{Pcell}$ value.

Since a resource corresponding to the existing KPcell may collide with a resource corresponding to the K', an offset is applicable to the implied resource in order to prevent the collision. The offset may be signaled in a specific field of a DCI, for example, an ACK/NACK resource offset (ARO) field. The offset may be transmitted by both of a DCI corresponding to the KPcell and a DCI corresponding to the K' or by only the DCI corresponding to the K'.

Meanwhile, when the ACK/NACK is transmitted through the PUCCH format 3, the ACK/NACK may be arranged in a following scheme.

1. In a case of an HARQ process for the same cell (or a cell having the same cell index), an ACK/NACK corresponding to the KPcen is firstly arranged in a most significant bit (MSB), and then the ACK/NACK corresponding to the K' is arranged. When a timing corresponding to the K' may be configured, it is available.

2. In a case of an HARQ process for the same cell (or a cell having the same cell index), the MSB is firstly arranged from in a time order of the subframe regardless of the ACK/NACK corresponding to the KPcell and the ACK/NACK corresponding to the K'.

3. In a case of an HARQ process for the same cell (or a cell having the same cell index), the MSB is firstly arranged from in an order defined in the group K regardless of the ACK/NACK corresponding to the KPcell and the ACK/NACK corresponding to the K'.

Figure 22:
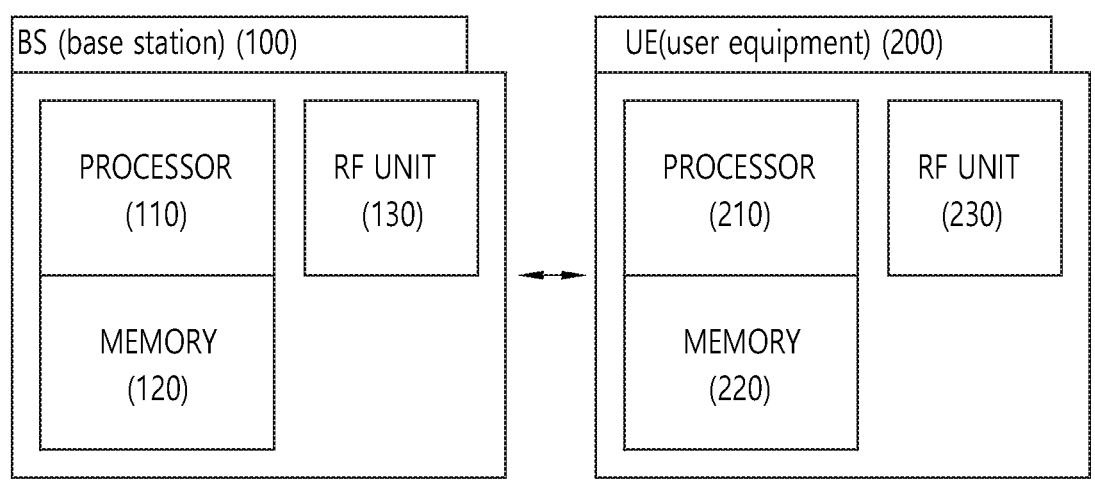
FIG. 22 is a block diagram illustrating a wireless device according to an embodiment of the present invention.

FIG. 22 is a block diagram illustrating a wireless device according to an embodiment of the present invention.

A base station 100 includes a processor 110, a memory 120, and a radio frequency (RF) unit 130. The processor 110 performs the proposed functions, processes and/or methods. For example, the processor 110 configures a plurality of serving cells using different frame structures in a terminal. For example, the processor 110 may configure an FDD cell using an FDD frame and a TDD cell using a TDD frame. Next, the processor 110 may transmit data through the FDD cell, and may receive an ACK/NACK for the data through the TDD cell. A time relationship between a subframe transmitting the data and a subframe receiving the ACK/NACK for the data may be determined by a first HARQ timing or a second HARQ timing. The memory 120 is connected to the processor, and stores various information for operating the processor 110. The RF unit 130 is connected to the processor 110, and sends and receives radio signals.

A terminal 200 includes a processor 210, a memory 220, and an RF unit 230. The processor 210 performs the proposed functions, processes and/or methods. For example, the processor 210 may receive a configuration of an FDD cell using an FDD frame and a configuration of a TDD cell using a TDD frame. The processor 210 may receive data through the FDD cell, and may transmit an ACK/NACK for the data through the TDD cell. A time relationship between a subframe receiving the data and a subframe transmitting the ACK/NACK may be determined by a first HARQ timing or a second HARQ timing.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

What is claimed is:

1. A method for receiving acknowledgement/negative-acknowledgement (ACK/NACK) information, the method performed by a base station (BS) and comprising:

transmitting, to a user equipment (UE) configured with a primary cell and a secondary cell, data in a plurality of downlink subframes of the secondary cell using a frequency division duplex (FDD) frame; and receiving, from the UE, ACK/NACK information informing ACK/NACK bits in an uplink subframe of the primary cell using a time division duplex (TDD) frame, wherein, based on physical uplink control channel (PUCCH) format 3 being configured for transmission of the ACK/NACK information, the ACK/NACK bits are arranged as a time order of the plurality of downlink subframes and a most significant bit (MSB) of the ACK/NACK bits informs ACK/NACK for data received in a first downlink subframe among the plurality of downlink subframes and the ACK/NACK information informing the ACK/NACK bits are transmitted through the PUCCH format 3.

2. The method of claim 1, wherein the primary cell is configured with one of uplink-downlink configurations in a following table 1,

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein, in the table 1, D denotes a downlink subframe, S denotes a special subframe, and U denotes an uplink subframe.

3. The method of claim 1, wherein, based on the PUCCH format 3 being used for transmitting the ACK/NACK information, a symbol sequence related with the ACK/NACK information is spread with an orthogonal sequence.

4. A base station (BS) comprising:
a transceiver configured to transmit and receive a radio signal; and
a processor connected to the transceiver,
wherein the processor is configured to:
transmit, to a user equipment (UE) configured with a primary cell and a secondary cell, data in a plurality of downlink subframes of the secondary cell using a frequency division duplex (FDD) frame; and
receive, from the UE, ACK/NACK information informing ACK/NACK bits in an uplink subframe of the primary cell using a time division duplex (TDD) frame,
wherein, based on physical uplink control channel (PUCCH) format 3 being configured for transmission of the ACK/NACK information, the ACK/NACK bits are arranged as a time order of the plurality of downlink subframes and a most significant bit (MSB) of the ACK/NACK bits informs ACK/NACK for data received in a first downlink subframe among the plurality of downlink subframes and the ACK/NACK information informing the ACK/NACK bits are transmitted through the PUCCH format 3.

5. The BS of claim 4, wherein the primary cell is configured with one of uplink-downlink configurations in a following table 1,

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein, in the table 1, D denotes a downlink subframe, S denotes a special subframe, and U denotes an uplink subframe.

6. The BS of claim 4, wherein, based on the PUCCH format 3 being used for transmitting the ACK/NACK information, a symbol sequence related with the ACK/NACK information is spread with an orthogonal sequence.

* * * * *